(12) United States Patent
Komninos

(10) Patent No.: US 7,051,577 B2
(45) Date of Patent: May 30, 2006

(54) MULTI-FUNCTIONAL LEAK DETECTION INSTRUMENT ALONG WITH SENSOR MOUNTING ASSEMBLY AND METHODOLOGY UTILIZING THE SAME

(75) Inventor: Nikolaos I. Komninos, Littleton, CO (US)

(73) Assignee: Radiaulics, Inc., Littleton, CO (US)

( * ) Notice: Subject to any disclaimer, the term of this patent is extended or adjusted under 35 U.S.C. 154(b) by 0 days.

(21) Appl. No.: 10/735,520

(22) Filed: Dec. 12, 2003

(65) Prior Publication Data
US 2005/0126264 A1    Jun. 16, 2005

(51) Int. Cl.
*G01M 3/04* (2006.01)
(52) U.S. Cl. ..................... 73/40.5 A; 73/40.7
(58) Field of Classification Search ............... 73/40.7, 73/40.5 A
See application file for complete search history.

(56) References Cited

U.S. PATENT DOCUMENTS

| | | | |
|---|---|---|---|
| 3,991,360 A | 11/1976 | Orth et al. | |
| 4,045,729 A | 8/1977 | Loh | |
| 4,462,249 A * | 7/1984 | Adams | 73/40.5 A |
| 5,103,675 A | 4/1992 | Komninos | |
| 5,104,513 A | 4/1992 | Lee et al. | |
| 5,432,755 A | 7/1995 | Komninos | |
| 5,436,556 A | 7/1995 | Komninos | |
| 5,445,026 A * | 8/1995 | Eagan | 73/591 |
| 5,561,344 A | 10/1996 | Hsi | |
| 5,932,176 A | 8/1999 | Yannopoulos et al. | |
| 6,058,076 A | 5/2000 | Komninos | |
| 6,079,275 A | 6/2000 | Komninos | |
| 6,163,504 A | 12/2000 | Komninos et al. | |
| 6,234,021 B1 * | 5/2001 | Piety et al. | 73/592 |
| 6,509,562 B1 | 1/2003 | Yang et al. | |
| 2004/0005715 A1 * | 1/2004 | Schabron et al. | 436/104 |
| 2004/0050188 A1 * | 3/2004 | Richards et al. | 73/866.3 |

FOREIGN PATENT DOCUMENTS

JP    4325489 A  * 11/1992

OTHER PUBLICATIONS

Derwent abstract (English language) for JP-4325489A.*
Photograph and CAD drawings of a leak detection instrument marketed under the designation "Accutrak", Model no. J41416.
Photograph of a dis-assembled gas detection instrument.
Photograph of a refrigerant leak detector, printed from http://www.bacharach-inc.com/.

* cited by examiner

*Primary Examiner*—Michael Cygan
(74) *Attorney, Agent, or Firm*—Timothy J. Martin; Michael R. Henson

(57) ABSTRACT

A leak detection instrument may comprise a housing, a gas sensor supported relative to the housing, an AE sensor for generating a sound detection input signal upon exposure to gas leakage, processing circuitry for producing output signals, and an output device. The AE sensor may include an elongated mounting member, an AE sensor housing supported by the mounting member, and an AE sensor disposed therein. Improvements to leak detection instruments, an AE sensor mounting assembly and a method of monitoring a device to ascertain leakage of a target gas therefrom are also provided.

37 Claims, 16 Drawing Sheets

MULTI-FUNCTIONAL LEAK DETECTION INSTRUMENT ALONG WITH SENSOR MOUNTING ASSEMBLY AND METHODOLOGY UTILIZING THE SAME

FIELD OF THE INVENTION

The present invention broadly relates to the field of leak detection. More particularly, the present invention is concerned with detectors and methodologies for monitoring gas leakage to detect the presence, and location, of selected gases, as well as the airborne sound attendant therewith. The invention is even more specifically directed to the integration of known sensing techniques into a single instrument packaging to facilitate leak detection.

BACKGROUND OF THE INVENTION

There are various situations where it is important to detect the presence of specific gases in an atmosphere. Certain gases may be harmful to humans making it desirable to monitor a system's environment to ensure that the concentration of selected gases does not exceed certain threshold limits. Pressurized systems also need to be monitored for leaks to ensure they are functioning properly to avoid future damage. Leak detection, however, can be a complex and costly endeavor. Depending on the system and the application where a gas or liquid may be stored, the sensitivity of a leak detector to a given substance is a complex function of operational, environmental, health and economic issues.

For example, air escaping out of a compressor tank or air line may be difficult to locate and repair because the sound it makes can be masked by other sounds or the location may be invisible or inaccessible. Other examples are the leakage from air conditioning equipment, fire extinguishing equipment, or refrigerant gas out of a refrigeration system. Where a refrigeration system is concerned, for example, the functional, environmental, health and economic issues are unique. Government regulations may prohibit the leakage of a refrigerant gas above a certain level. Loss of refrigerant may be accompanied by loss of lubricant, which will affect the function of the system. Both of these conditions alone will generate cost to the owner, which will have to act within constraints of the law and economic capabilities to properly maintain the system.

Depending on the nature of the system, locating the various types of possible leaks may require completely different tools and methodologies. Location of a refrigerant leak may require a panoply of tools and equipment since, for a given situation, there may be a number of refrigerant gases each requiring a special detector. The gas families used in refrigeration allow the use of sensors that "cross-over", meaning that a particular sensor optimized to work best for one gas, such as R12, will also work for another gas, such as R134A. However, if the gas is from a different family, such as R422, the sensor used in the detection of R12 gas will not be as sensitive. Sensitivity of sensors for a particular gas or family of gases is referred to as the minimum detectable amount (MDA) and is measured in parts per million (ppm).

Reliability of readings from gas sensors, however, can be misleading since the dispersion of leaking gas in air results in the density of the gas varying according to the distance the measurement is taken from the leak source. For example, suppose the ultimate sensitivity of a leak detector is 10 ppm for a given type of gas. If the dilution of the gas in air is such that there is only 1 ppm, the detector will not detect its presence. Such a situation is possible when there is wind blowing the leaking gas, thereby dispersing it, and in effect diluting it. Situations such as this make it very difficult to ascertain the existence of a leak and pinpoint its location because, to trace the gas to the leak, the sensor must collect enough gas and the density of this gas must stay within the sensor's capabilities. Even though the leak rate may be orders of magnitude over the MDA of the sensor, a wind's dispersion effect may reduce it to below the MDA. Such a situation can be quite common in refrigeration and A/C field servicing. Accordingly, a technician needs to carry several leak detectors since they compliment each other in the quest of locating a leak.

Within the family of gas sensors, also referred to as gas detectors, are the chemical properties leak detectors (CPLDs). CPLDs are very sensitive and can reach an MDL of 0.1 oz per year, but suffer from contamination, wind dilution and saturation. CPLDs are based on ionization or ion capture of the leaking gas. Special sensing elements are used to generate a signal when the gas is present. Examples of CPLDs are discussed in the following patents: U.S. Pat. No. 5,104,513 to Lee et al., U.S. Pat. No. 5,932,176 to Yannopoulos et al., U.S. Pat. No. 3,991,360 to Orth et al., and U.S. Pat. No. 4,045,729 to Loh.

Another type of gas sensor, known as the thermal conductivity detector (TCD), compares the thermal conductivity of air to a gas that is drawn by heating a wire or thermal sensor. Changes to the thermal balance of the wire causes the sensor to detect the presence of a gas. Sensors using thermal conductivity, while suffering from the same problems as the CPLD type sensors, can detect inert gases at low levels that are undetectable by CPLDs and ultrasonic sensors. An example of a commercially available leak detection instrument which utilizes a TCD is the LeakCheck, sold by EFD Instruments of NY. Gas sensors can also be of a variety of other types including the Photo Ionization type (PID), such as discussed in U.S. Pat. Nos. 5,561,344 and 6,509,562, the chemical detector type (CD), the laser interferometer type (LID), the corona discharge type (CDD), microelectromechanical systems (MEMS) based sensors, or surface acoustic wave (SAW) sensors, to name a few.

Other types of known detectors can broadly be characterized as listening devices because they listen to the sound caused by leak flow into or out of a system. This sound can be either air-borne or structure-borne and be in the sonic or ultrasonic range. Listening devices of this type generally utilize an acoustic emissions (AE) sensor to detect the leak. One particular type of listening device is known as an ultrasonic leak detector (ULD). There are a number of ULD instruments available, such as those described in my following patents: U.S. Pat. No. 5,103,675, U.S. Pat. No. 5,432,755, U.S. Pat. No. 5,436,556, U.S. Pat. No. 6,058,076, U.S. Pat. No. 6,079,275, and U.S. Pat. No. 6,163,504. Each of my earlier ULDs employs an AE sensor, either alone or in conjunction with a touch probe, to conveniently detect air-borne sound, structure-borne sound, or both.

ULDs are very useful in refrigeration systems since they can detect vacuum leaks and are not affected by wind. ULDs listen to the sound the flow of a leaking gas makes as it escapes from a container or is being sucked in under vacuum. Sound is generated as the gas expands and its flow becomes turbulent. Because of this principle, ULDs can detect any type of gas. Under ideal conditions, the minimum flow ULDs can detect is approximately 0.01 SCCM (standard cubic centimeters per minute). Their ultimate sensitivity, though, does not reach the desired leak flow rate of 0.5 oz per year in the refrigeration field. Additionally, background noise can make it difficult to locate the leak point. Thus, leak detection with ULDs can also have its limitations.

Another approach to ascertaining the presence of gases, for example refrigerant gases which have been injected with a dye, is through the use of ultraviolet (UV) illumination. This causes the gas, or its residue, to fluoresce, thereby leaving a visual indication of its presence.

While the art is ripe with numerous approaches for detecting leak characteristics, these various techniques have essentially evolved in isolation. The result has been that service technicians often need numerous tools at their disposal to effectively monitor leaks. This can become cumbersome and often results in inefficiency, inconvenience, and added cost. Accordingly, there is a need to overcome these disadvantages so that technicians servicing any type of appliance that is charged, for example with a refrigerant gas, can do so reliably, in a time-efficient manner and with fewer tools. The present invention is directed to meeting these needs.

SUMMARY OF THE INVENTION

It is an object of the present invention to provide a new and useful leak detection instrument for monitoring gas leakage from a device.

Another object of the present invention is to provide a new and useful methodology for monitoring a device to ascertain leakage of a target gas therefrom.

A further object of the present invention is to provide a new and useful acoustic emissions sensor mounting assembly for use with a scientific instrument.

Still a further object of the present invention is to provide such a leak detection instrument that is multi-functional by integrating existing sensor technologies.

Yet another object of the present invention is to improve upon existing leak detection instruments which utilize AE sensor technologies by incorporating gas sensor capabilities, and vice versa.

It has been found that these objectives can be met, and the disadvantages associated with the prior art can be overcome, by integrating known gas detection capabilities into a single instrument. Of particular interest in the present application is the integration of at least gas sensing capabilities together with AE sensing capabilities into a single instrument. However, the ordinarily skilled person would understand from the description to follow that any combination of gas detection capabilities which has heretofore not been practiced utilizing a single leak detection instrument is specifically envisioned.

The multi-functional leak detection instrument which is the subject of the present application could prove very beneficial, for example, to technicians who service any type of appliance that is charged with a refrigerant gas. The AE sensor side would be able to detect the sound generated by the leaking gas and pinpoint its location, while the gas sensor side would be able to detect its presence.

Understandably, the particular environment for an instrument which integrates these technologies would be dictated, at least in part, by the choice of gas sensor. For example, if the gas sensor is for halogen gases, the combination would likely be used in refrigeration systems, whereas if the gas sensor is for combustible gases, then heating, furnace or combustion engineering, chemical and petrochemical applications could use the combination. Additionally, if the application is for Volatile Organic Compounds (VOC) the combination can be used in a specialized chemical detection for the detection of paint thinners and the like.

In accordance with the above, one embodiment of the present invention concerns an acoustic emissions (AE) sensor mounting assembly that is adapted for connection to a scientific instrument which includes an instrument housing, processing circuitry associated with the instrument housing, and an output device. The AE sensor mounting assembly broadly comprises an elongated mounting member adapted to releasably connect to the instrument housing, an AE sensor housing supported by the mounting member, and an AE sensor disposed within the AE sensor housing. The AE sensor, which may be a microphonic element for detecting sounds attendant with gas leakage, is adapted to be placed in electrical communication with the processing circuitry and operates upon exposure to sound attendant with gas leakage from a device to generate an input sound detection signal for processing. This input sound detection signal can then be communicated, such as through electrical interconnects, to the instrument's processing circuitry to produce an output signal so that perceptible output can be generated in response thereto by the output device.

The elongated mounting member may be a flexible tube, sometimes generally referred to as a "gooseneck", having a proximal end releasably connected to the instrument housing and extending from the proximal end to terminate at a distal end. Preferably, the AE sensor housing is releasably connected to the distal end of the flexible tube. Also, the AE sensor housing preferably incorporates a through bore in communication with the tubular extension to define a gas flow passageway between upstream and downstream ends of the AE sensor mounting assembly. To this end, the AE sensor housing may include a pair of bored end caps that are joined together to substantially surround an AE sensor housing interior. A downstream one of these end caps is removably attached to the mounting member, with an upstream one of the end caps supporting the AE sensor.

The AE sensor, such as the microphonic element discussed above, is advantageously mounted on a circuit board that is supported within the AE sensor housing interior. A plurality LEDs may be mounted on this circuit board, on the same surface as the AE sensor. The group of LEDs may comprise ultraviolet LEDs, infrared LEDs, or visible LEDs of any appropriate color. When UV LEDs are used, they operate upon emission of ultraviolet light to cause an appropriately dyed target fluid/gas or its residue in the vicinity of the AE sensor housing to fluoresce and thus become visible. Both the ultraviolet LEDs and the microphonic element project forwardly in an upstream direction. The upstream end cap includes a central bore that is directionally aligned with the microphonic element and a plurality of regular offset bores that are each axially aligned with a respective one of the ultraviolet LEDs. If desired, photodetectors, such as photodiodes or charged coupled devices (CCDs), could also be used in conjunction with one or more of the UV LEDs. Each photodiode or CCD would be reactive to fluorescent light from the target gas when it, or its residue, is exposed to UV radiation from the UV LEDs to generate a corresponding photo detection signal for processing.

A plurality of visible LEDs may be mounted on an opposite side of the circuit board and adapted to be placed in electrical communication with the processing circuitry. In addition a plurality of visible LEDs may be mounted in place of the UV LEDs or mixed together with them which can serve to illuminate an area in a vicinity of the AE sensor housing to aid the user in low light situations. Preferably, whatever types of LED's are chosen, they are equiangularly distributed about the AE sensor. A light transmissive annular ring may also be sandwiched between the sensor housing's end caps in radial alignment with the visible LEDs.

In a preferred exemplary form, the leak detection instrument comprises a gas sensor and an AE sensor each supported relative to the instrument housing, with the processing circuitry operative to receive respective input signals from each of these sensors and the output device operative to produce perceptible output in response thereto. To this end, the processing circuitry may incorporate a microcontroller, a microprocessor, a digital signal processor (DSP), or one or more combinations thereof. Advantageously also, the processing circuitry can incorporate analog, digital or a combination of analog and digital processing components.

The gas sensor may be a variety of types known in the art, such as a chemical property leak detector (CPLD), a corona discharge detector (CDD), a thermal conductivity detector (TCD), a photo ionization detector (PID), a laser interferometer (LID), a microelectromechanical (MEMS) based detector, a chemical resistor sensor (CRS), or a surface acoustic wave (SAW) detector, to name a few. The gas sensor is preferably disposed within the instrument housing upstream of a gas pump which operates upon actuation to draw the selected gas toward the gas sensor, such that when the gas sensor is exposed to the selected gas it generates a corresponding gas detection input signal. The AE sensor is preferably supported at an upstream location external to the instrument housing within an AE sensor mounting assembly, as discussed above. Preferably also, a hydrophilic filter is interposed between the AE sensor and the gas sensor, and located within the AE sensor housing, such that the gas is drawn by the pump through the filter before coming into contact with the gas sensor. Integrity of the filter can be monitored using a vacuum switch so as to produce an appropriate blocked filter indication (BFI) signal if the filter becomes contaminated or is efficacy reduced below a certain level. Preferably also, the processing circuitry which receives the gas detection input signal and the sound detection input signal is operative to parallel process these signals and transmit corresponding conditioned signals to the output device.

Another embodiment of the present invention contemplates a methodology of monitoring a device to ascertain leakage of a target gas therefrom. According to a preferred embodiment of this methodology, both a gas sensor and an AE sensor are provided and each exposed to the target gas to generate a gas detection input signal and a sound detection input signal, respectively. These two input signals are then processed to produce at least one output signal, and perceptible output is displayed in response thereto. Also according to this methodology, a vacuum is created to draw the target gas along a gas flow passageway from an upstream location that is in a vicinity of a suspected leak, through an appropriate filter, and towards a downstream location whereby the target gas encounters the gas sensor. The methodology also may incorporate the visible illumination of an area in the vicinity of the upstream location, as well as illumination of the area with ultraviolet light to cause the target gas to fluoresce.

The present invention also relates to improvements to known leak detection instruments, such as the ultrasonic leak detectors discussed in any of my following earlier patents, the disclosures of which are incorporated herein by reference: U.S. Pat. Nos. 5,103,675, 5,432,755 and 5,436,556, 6,058,076 and 6,163,504. The leak detection instruments, such as described in any of the above patents, incorporate an AE sensor supported relative to the instrument housing which is operative upon exposure to sound attendant with leakage from a device to produce a corresponding sound detection input signal. Processing circuitry receives the sound detection input signal and producing an AE sensor output signal in response thereto. Output circuitry generates associated AE sensor perceptible output, such as an audio or visible display, in response to the AE sensor output signal. The improvement to leak detection instrument (s), such as these, broadly comprises the incorporation of a gas sensor supported relative to the instrument housing which is operative upon exposure to a selected gas to generate a corresponding gas detection input signal. The improvement also preferably incorporates a pump within the instrument housing for drawing air passed the gas sensor, and gas sensor processing circuitry in electrical communication with the gas sensor for generating a corresponding gas detection output signal. To this end, the output circuitry is further operative to generate a associated gas sensor perceptible output in response to the gas detection output signal. According to this improvement, the gas sensor may be any of the various types discussed above Yet another aspect of the present invention relates to an improvement to a leak detection instrument, such as one incorporating known gas sniffer technology. Here, a gas sensor is supported relative to the instrument housing and operates upon exposure to a selected gas to generate a corresponding gas detection input signal. A pump draws air past the gas sensor and output circuitry displays associated gas sensor perceptible output in response to the gas detection input signal. The improvement to such a leak detection instrument broadly comprises the provision of an AE sensor supported relative to the instrument housing which generates a corresponding sound detection input signal upon exposure to sound attendant with leakage of the selected gas, as well as AE sensor processing circuitry in electrically communication with the AE sensor which operates in response to the sound detection input signal to generate a corresponding sound detection output signal. The output circuitry is preferably further operative in response to the sound detection output signal to generate associated perceptible output.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention concerns instruments for detecting leakage of gas or liquid from a device. For purposes of the disclosure, it should be appreciated that the term "device" should be construed as broadly as possible to encompass any kind of machinery, equipment, system or the like wherein a gas or liquid may be found and for which it is desirable to trace or ascertain the existence of leakage therefrom. Those familiar with servicing such devices would recognize that a panoply of tools and equipment may be required to locate leaks of different types and characteristics. Accordingly, the present invention relates to an integrated leak detection instrument which incorporates two or more known technologies to provide a versatile tool for service repair technicians and the like. To this end, while the exemplary embodiment of the present invention is discussed in connection with a single instrument which incorporates gas sensor technology and AE sensor technology, the present further contemplates instrumentation and methodologies which incorporate other combinations of detection techniques into a single instrument package.

Figure 1:
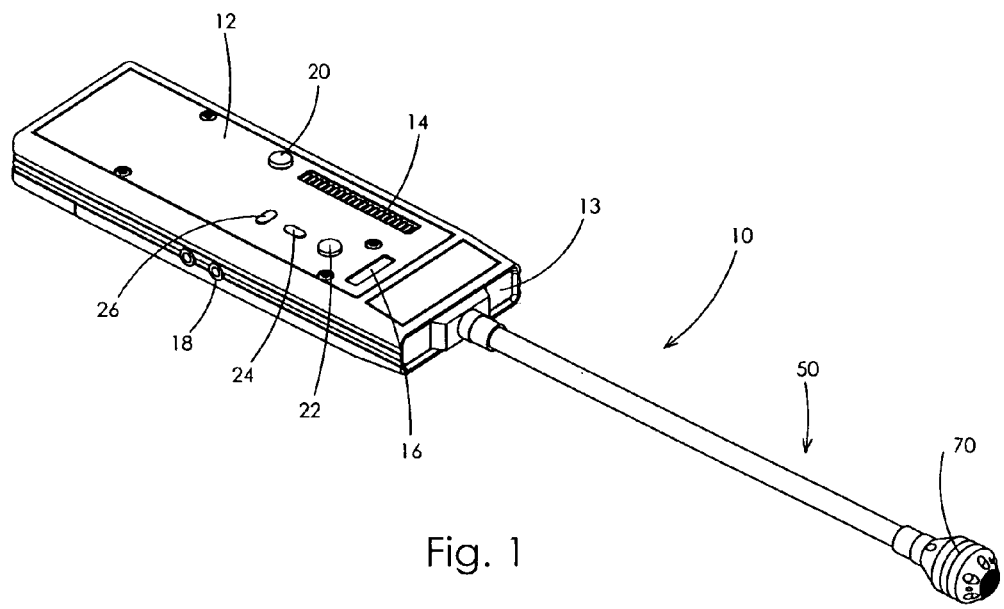
FIG. 1 is a perspective view of an exemplary embodiment for the leak detection instrument of the present invention.
Figure 2:
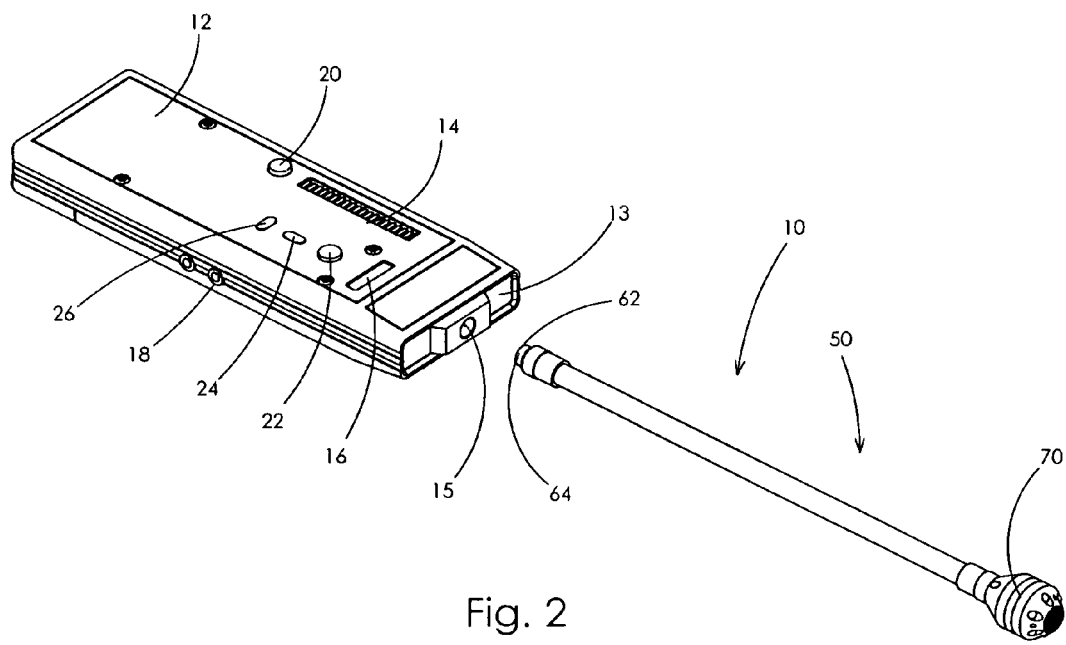
FIG. 2 is a first exploded perspective view of the leak detection instrument of FIG. 1.

With initial reference then to FIGS. 1 and 2, an exemplary embodiment of a leak detection instrument 10 of the present invention is shown. Leak detection instrument 10 is capable of detecting various characteristics associated with leakage from a device. Leak detection instrument 10 has an instrument housing 12 which internally supports appropriate processing circuitry that may be mounted on independent, yet interconnected, circuit boards. As will be discussed in greater detail below, leak detection instrument 10 in its preferred embodiment incorporates a plurality of sensors, namely an acoustic emissions (AE) sensor and a gas sensor.

Preferably also, leak detection instrument 10 is provided with both visible and ultraviolet LEDs to facilitate the leak detection process. Housing 12 also supports a signal strength indicating meter 14, which may be an array of light emitting diodes for visually indicating the strength of the received input signals from either or both of the AE sensor and the gas sensor. Another visual output in the form of an alphanumeric display 16 indicates signal strength of the received signals from the sensors, as well as displaying the various modes of operation and the volume and sensitivity levels for detector 10. Audible output is obtained by way of earphones (not shown) which are electrically connected to the circuitry contained within housing 12 via headphone jack 18. A first push button activation switch 20 is provided to toggle leak detection instrument 10 between on and off conditions. A second push button activation switch 22 may be provided to toggle between the various operational modes for the leak detection instrument, and third and fourth push button activation switches 24 and 26 may be used to selectively adjust the sensitivity and volume levels within a given operational mode.

The various circuitry components associated with the processing of sound detection input signals generated by the AE sensor associated with the leak detection instrument 10 can take on a variety of forms and characteristics. For example, analog processing circuitry is discussed in my U.S. Pat. Nos. 5,103,675, 5,432,755 and 5,436,556, while a combination of analog and digital processing is disclosed in my U.S. Pat. Nos. 6,058,076 and 6,163,504. As discussed below with reference to FIGS. 12–14(c), relevant portions of each of these above patents, pertaining to processing signals from the AE sensor of leak detection instrument 10, are incorporated herein by reference. It should also be understood that the housing 12 for the leak detector could assume a variety of different looks and configurations such that the figures are for illustrative purposes only. Indeed, the configuration of the instrument's housing need only be designed to accommodate the various components necessary for effectuating the purposes of the present invention, with the various audible and visual output indicators, selection switches and the like being tailored to one's design preferences.

Figure 3:
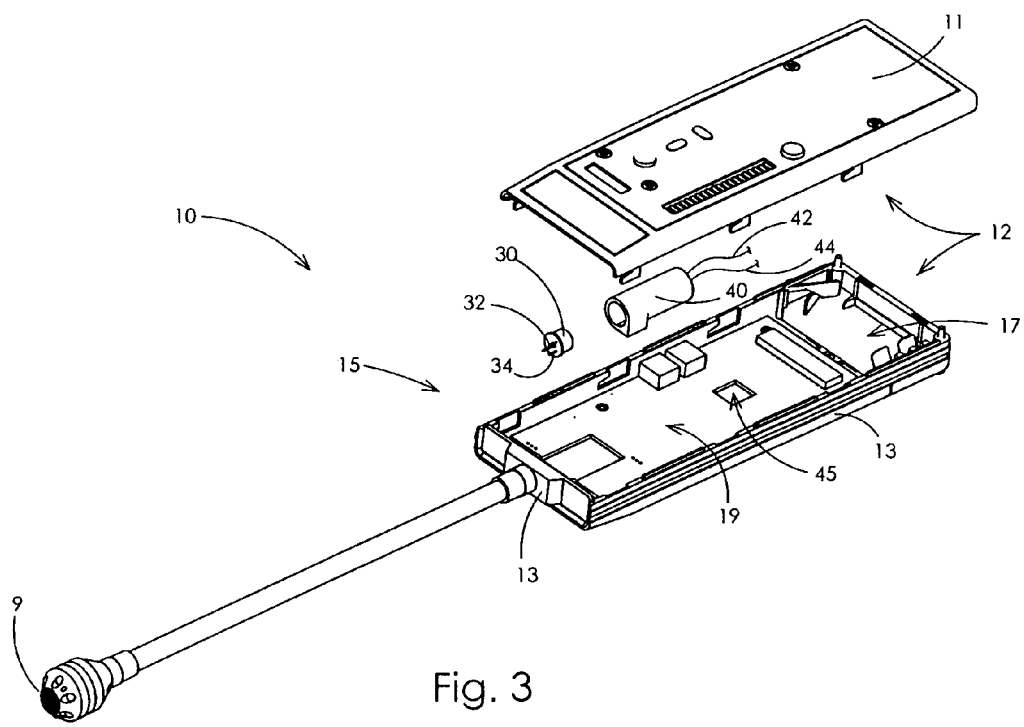
FIG. 3 is a second exploded perspective view of the leak detection instrument of FIG. 1.

As perhaps best shown in FIG. 3, the instrument housing 12 for leak detection instrument 10 includes a pair of upper and lower case pieces 11 and 13, respectively, which substantially enclose an instrument housing interior 15 that is divided into a battery compartment region 17 and a circuit board(s) region 19. As also generally shown in FIG. 3, a gas sensor 30 and an associated pump 40 are appropriately supported within the interior 15 of housing 12. Together, sensor 30 and pump 40 can be considered a gas sniffer. Power to gas sensor 30 and pump 40 is provided via appropriate electrical leads 32, 34 and 42, 44. These leads couple to the detector's power supply, i.e. battery, via appropriate power supply regulator circuitry, as would be apparent to the ordinarily skilled artisan in this field. To this end gas sensor 30 may be a chemical properties leak detector (CPLD) such as that described in U.S. Pat. No. 5,932,176 to Yannopoulos et al., issued Aug. 3, 1999. In this patent, the disclosure of which is incorporated by reference, a halogen gas sensor and its associated electrical circuitry is described for use in detecting refrigerant vapors.

Preferably, pump 40 is located downstream and in general directional alignment with gas sensor 30 so that the vacuum created by pump 40 serves to draw environmental gas in a downstream direction from a vicinity of the upstream end 9 of leak detection instrument 10, thereby to encounter gas sensor 30. As also generally shown in FIG. 3, housing 12 may be provided with an appropriate gas purge port 45 formed through lower casing piece 11, or elsewhere, to evacuate the gas after it has been drawn into the instrument and exposed to the gas sensor 30. The leak detector's onboard pump 40 which draws the atmospheric gas into the instrument's housing can be a diaphragm pump, a paddle wheel pump, a vane or any other small pump. Such pumps are commercially readily available from many sources worldwide, such as Thomas Industries, Inc. of Sheboygan, Wis. While a preferred gas sensor 30 for leak detection instrument 10 is a CPLD-type sensor such as described in the Yannopoulos et al. reference, other known CPLD sensors could be substituted. Additionally, sensor 30 could be of other appropriate types without departing from the inventive concepts herein, including a TCD, a CD, a CDD a PID, a MEMS, a SAW, a CR, or an LID, to name a few. Combinations of two or more different types of gas sensors are also contemplated.

Figure 4:
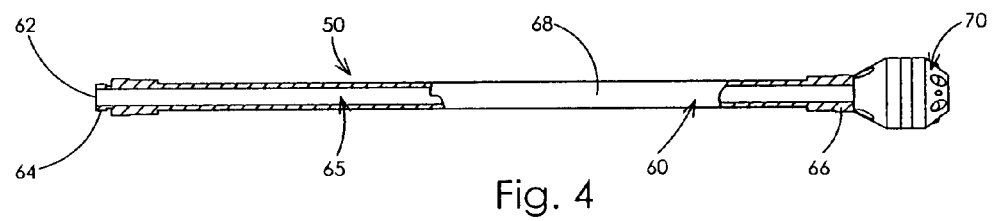
FIG. 4 is a side view in partial cross-section of the leak detector's acoustic emissions (AE) sensor mounting assembly.

Also associated with leak detection instrument 10 is an acoustic emissions (AE) sensor mounting assembly 50 which, as shown in FIGS. 1 and 2, removably attaches to the front end (i.e. base support) 13 of the instrument's housing 12. As more particularly shown in FIGS. 2 and 4, AE sensor mounting assembly 50 includes an elongated mounting member 60 which extends between a proximal end 62 having associated threads 64 which threadedly engage a threaded opening 15 formed in base support 13, to a distal end 66 which supports an AE sensor housing 70, also through a threaded engagement. Mounting member 60 is preferably constructed as a flexible tube, sometimes generally referred to in the art as a "gooseneck", to allow positioning of the AE sensor housing 70 close to areas that are difficult to reach. As such, mounting member 60 may be any appropriate construction, such as corrugated metal hose encased in an outer plastic sheath (not shown). Elongated mounting member 60, thus, has an outer sidewall 68 which surrounds an interior 65 between proximal end 62 and distal end 66.

Figure 5:
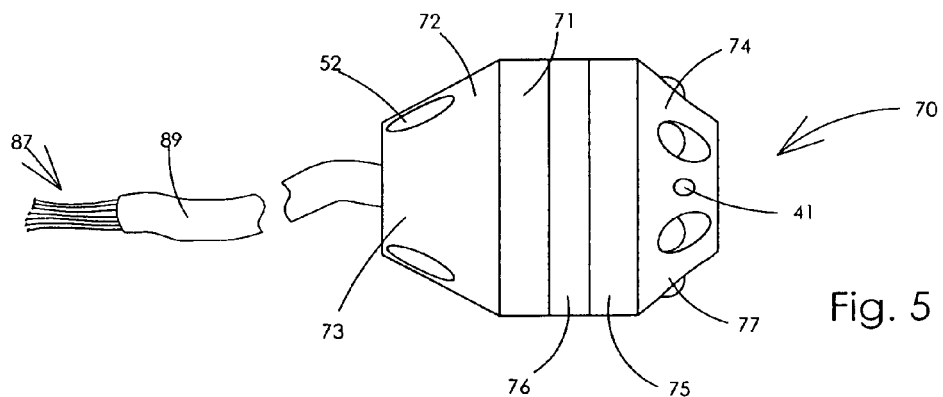
FIG. 5 is an enlarged side view in elevation of the housing assembly for the AE sensor mounting assembly.
Figure 6A:
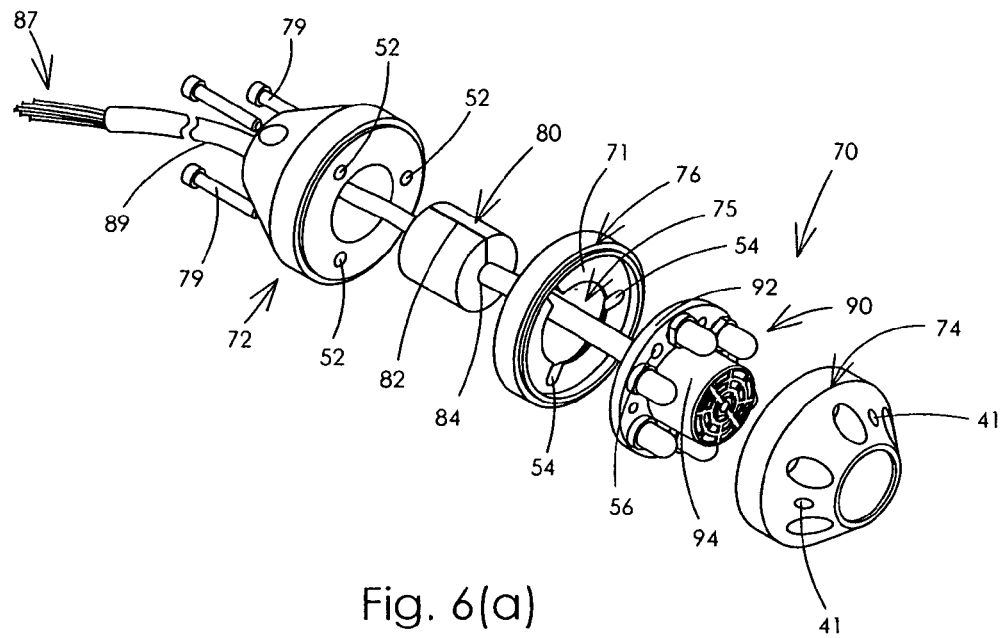
FIGS. 6(a) and 6(b) are each exploded perspective views of the AE sensor housing assembly.
Figure 6B:
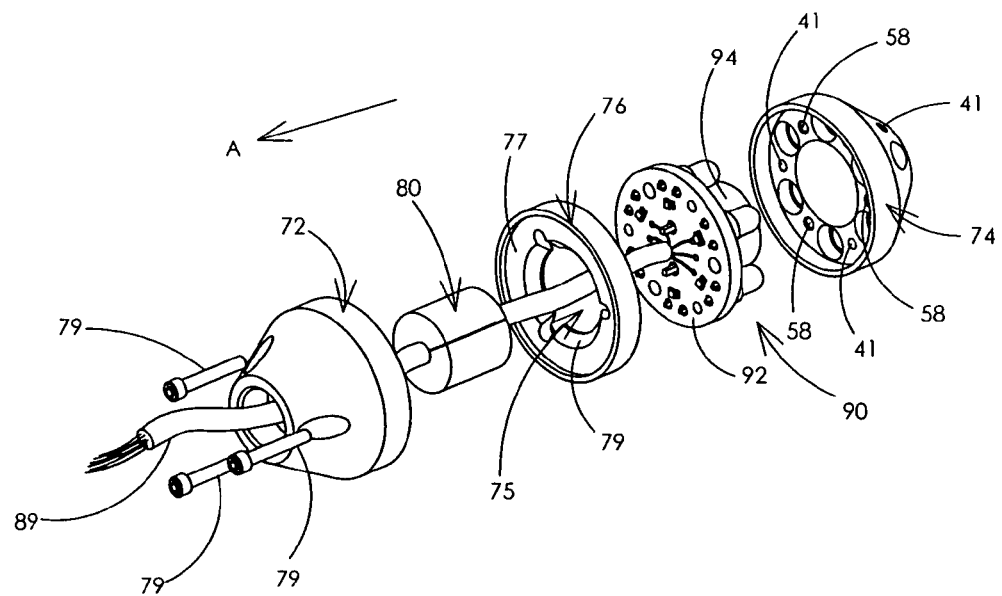

The AE sensor housing which contains the internal AE sensor is best shown in FIGS. 5, 6(a) and 6(b). AE sensor-housing 70 includes a pair of bored end caps 72 and 74 which are joined together to substantially surround an AE sensor housing interior. Preferably sandwiched between end caps 72 and 74 is an annular ring 76 made of an optically clear material, such as a red transparent plastic. As can be seen in the figures, AE sensor housing 70 has a tapered nose construction by virtue of the configuration of end caps 72 and 74. That is, the distal upstream end cap 74 has a cylindrical base portion 75 and a frustoconical portion 77. Similarly, downstream end cap 72 which threadedly engages the tubular mounting member 60 has a cylindrical base portion 71 and a frustoconical portion 73. Cylindrical base portions 71 and 75 are mounted in facing relationship to one another so that the AE sensor housing 70 generally tapers in both the upstream and downstream directions. Housed internally within the AE sensor housing 70 is a hydrophilic filter element 80 and a circuit board assembly 90 which includes a circuit board substrate 92 having a plurality of surface mounted electrical components including the AE sensor 94.

Figure 7A:
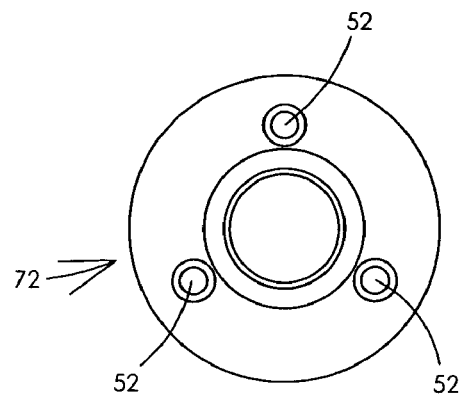
FIG. 7(a) is a rear plan view of the downstream end cap for the AE sensor housing.
Figure 7B:
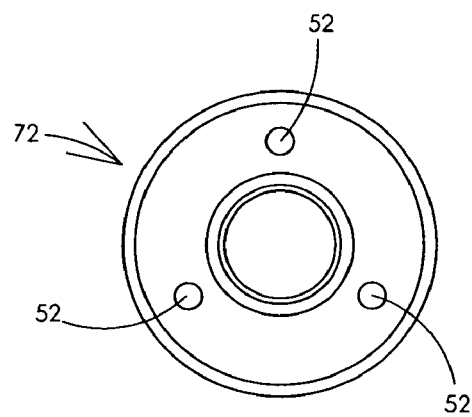
FIG. 7(b) is a front plan view of the downstream end cap for the AE sensor housing.

End caps 72 and 74, which may be constructed of plastic or other suitable material, are secured together by a plurality of screws 79 each of which extends through respective aligned bores 52, 54, 56 that are respectively formed through end cap 72, annular ring 76, and circuit board 90, and threaded cavities 58 formed partially through end cap 74. The bores 52 for end cap 72 may best be seen in FIGS. 7(a) and 7(b), whiles the cavities 58 for end cap 74 may best be seen in FIG. 8(b). As shown in the various figures, each piece 72, 74, 76 and 92 has three such bores/cavities which are equiangularly distributed about their centers.

Figure 9A:
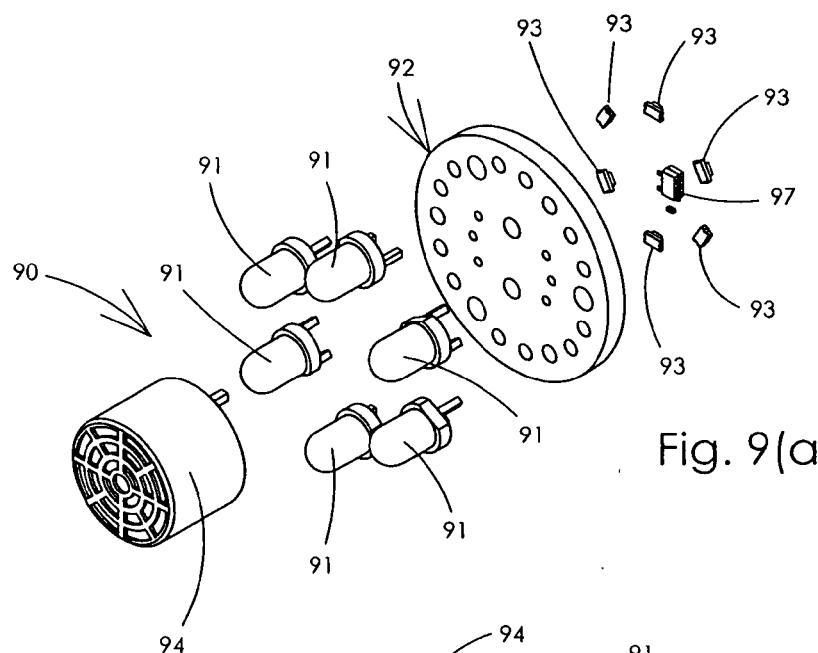
FIGS. 9(a) and 9(b) are each exploded perspective views for illustrating the AE sensor housing's circuit board assembly.
Figure 9B:
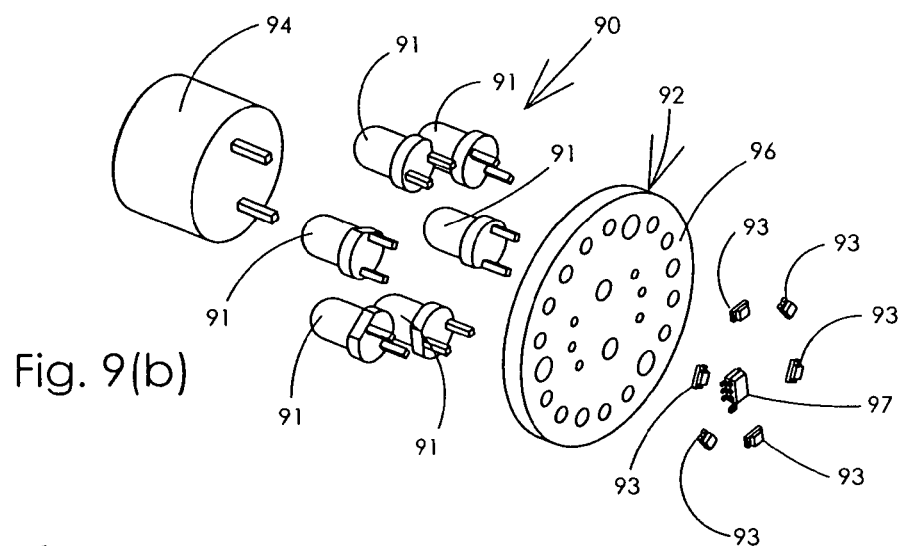
Figure 10:
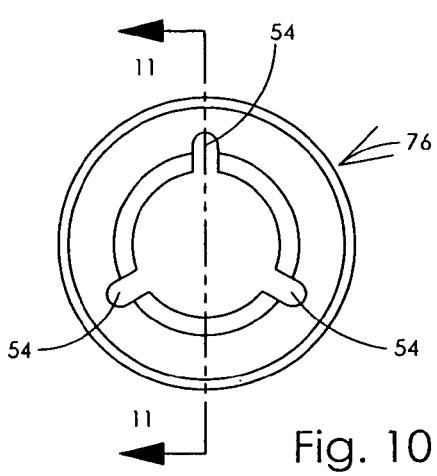
FIG. 10 is a rear plan view of the sensor housing's annular ring.

Circuit board assembly 90 will now be generally discussed with reference to FIGS. 9(a) and 9(b). Circuit board assembly 90 includes a disk-shaped printed wire circuit board substrate 92 to which is surface mounted a variety of electrical components which comprise the front end processing for the AE sensor side of the leak detector, as well as providing both visible and ultraviolet (UV) illumination capabilities. More particularly, AE sensor 94 is mounted and projects from an upstream face 95 of substrate 92, as do a plurality of UV LEDs 91 which are equiangularly distributed around AE sensor 94. If desired, photodiode(s) or CCD(s) could be incorporated to work in conjunction with one or more UV LEDs 91 shown in the various figures. These photodiode(s)/CCD(s) would understandably react to the receipt of fluorescent light from the target gas, or its residue, to generate or more corresponding diode or CCD detection signals, thereby providing UV sensing capabilities. As also shown in FIGS. 9(a) and 9(b), a plurality of visible LEDs 93 are surface mounted to a downstream face 96 of substrate 92 and equiangularly distributed about the center thereof. These visible LEDs 93 may be in general radial alignment with the UV LEDs.

An IC chip 97 is also surface mounted to downstream face 96. IC chip 97 provides pre-amplification for the input sound detection signal produced by AE sensor 94. IC chip 97 specifically houses one or more amplifiers, such as amplifier 106 associated with the pre-amplification circuitry 34 that is discussed with reference to FIGS. 2 and 3(a) of my U.S. Pat. No. 6,058,076, the disclosure of which is incorporated herein by reference. Although not shown in FIGS. 9(a) and 9(b) here, other discrete biasing components, such as those specifically shown in FIG. 3(a) of the '076 patent for appropriately biasing amplifier 106, are preferably also surface mounted to substrate 92. As such, IC chip 97 and its associated components, accomplishes some of the front end processing functions for AE sensor 94. In addition, the respective anodes and cathodes of UV LEDs 91 and visible LEDs 93 are electrically connected to appropriate pads in the circuit board 92, to provide them with power.

As generally represented in FIGS. 5, 6(a) and 6(b), a plurality electrical leads 87, contained in an insulative sleeve 89, extend from substrate 92 centrally through the bored sensor housing assembly 70. To this end, each of annular ring 76, hydrophilic filter 80 and downstream end cap 72 are centrally bored to accommodate the electrical leads. Filter element 80, in fact, has a radial slot 82 which communicates with its central bore 84 to provide for easy insertion of the electrical leads. Although not specifically shown, it should be appreciated that these leads 87 also extend down through the interior 65 of elongated mounting member 60 to appropriately connect to the remainder of the processing circuitry contained on the circuit boards internally associated with the housing for the leak detector of the present invention. Many such electrical leads can be provided for interconnection to substrate 92 to provide appropriate power and control for the circuitry components mounted thereon. For example, aside from a grounding wire, control inputs would be provided for each set of UV-LEDs, visible LEDs, photodiodes and CCDs, if any. In addition, where only one amplification stage is employed, two electrical leads would provide power to the amplifier, with another lead providing the amplified signal output from the AE sensor 94. Alternatively, where multiple amplification stages are provided, differential output can be obtained, thus requiring one additional lead for the differential output.

Figure 8A:
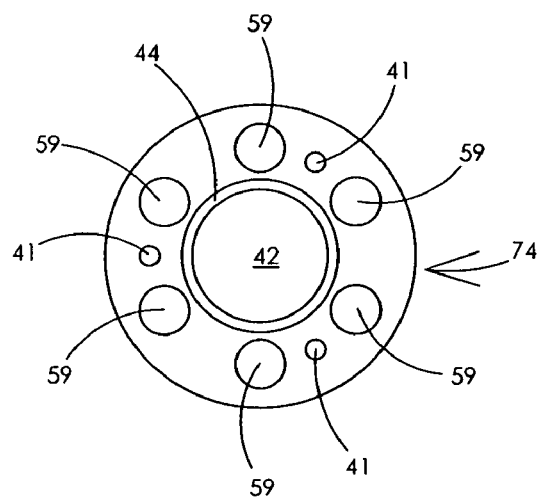
FIG. 8(a) is a front plan view of the upstream end cap for the AE sensor housing.
Figure 8B:
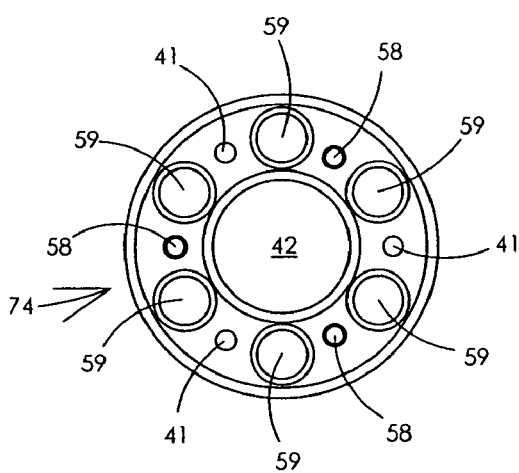
FIG. 8(b) is a rear plan view of the upstream end cap for the AE sensor housing.
Figure 11:
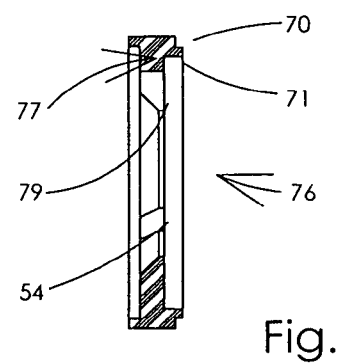
FIG. 11 is a cross-section of the annular ring as viewed about line 11—11 in FIG. 10.

When the AE sensor housing 70 is in the assembled state shown in FIG. 5, the upstream face 95 of substrate 92 is seated between the annular wall 46 of end cap 74 (FIGS. 6(b) and 8(b)) and the annular wall 71 of ring 76 (FIGS. 6(a) and 11) such that the AE sensor 94 is received within the bored central opening 42 of end cap 74 proximate to lip 44 thereof. As such, AE sensor 94 is directionally exposed to the external environment so that it can detect the sound attendant with leakage in the vicinity of the upstream end of the AE sensor head and generate a corresponding sound detection input signal which is conditioned and transmitted via the electrical leads to the remaining processing circuitry disposed within the leak detector's housing. The projecting brim wall 47 of end cap 72 (FIGS. 6(a) and 7(b)), when in the assembled state, is mounted in facing contact with annular wall 77 of ring 76. The visible LEDs 93 are positioned in general radial alignment with angled internal wall 79 of annular ring 76. This angled wall 79 is beveled at an angle so that the light emitted from the visible LEDs 93, is reflected toward the outside ring wall creating a radial external halo effect around sensor housing 70 to indicate the presence of an output signal from the sensors, such as in the case of a detected leak. Understandably, the particular angle of beveled wall 79 which accomplishes this halo effect is dependent upon the material selected for annular ring 76 and the directional orientation of the visible LEDs 93 which, in the illustrated embodiment, are surface mounted to emit light in the downstream direction of arrow "A" in FIG. 6(b).

When the leak detector's internal pump 40 is activated it operates to draw environmental gas in a downstream direction through an airflow passageway defined by the construction of the AE sensor head 70 and the tubular mounting member 60 so that the environmental gas encounters internal gas sensor 30. To this end, a plurality of equiangularly distributed air ports are bored through the various pieces of the AE sensor housing assembly to permit the passage of airflow therethrough. More particularly, three such equiangularly distributed apertures 41 are formed through upstream end cap 72 (See FIGS. 5, 6(a), 6(b), 8(a) and 8(b)). These apertures 41 are aligned with respective apertures 43 formed through the circuit board substrate 92. Thereafter, the drawn gas passes through opening 75 in annular ring 76, through hydrophilic filter 80, centrally through end cap 72 and down the interior 65 of mounting member 60. A gas flow passageway is, thus, defined for the AE sensor mounting assembly.

As discussed above, the exemplary embodiment of the leak detector of the present invention merges existing leak detection technologies into a single instrument package such that its various versatilities can be readily appreciated. That is, leak detection instrument 10 is capable of detecting the sound attendant with leakage by virtue of the AE sensor 94 that is supported relative to the instrument housing which generates a corresponding sound detection input signal for processing. Additionally, the internal gas sensor 30 is operative upon exposure to a target gas, by virtue of it being drawn to the gas sensor by the internal pump 40, to generate a corresponding gas detection input signal for processing. Activation of the ultraviolet LEDs 91, which emit UV radiation through the aligned apertures 59 formed in end cap 74 (FIGS. 8(a) and 8(b)), causes an appropriately dyed target gas which is in a vicinity of the AE sensor housing 70 to fluoresce, thereby providing an alternative indication of presence of a target gas. Finally, activation of the visible LEDs 93 indicate the location of a leak informing the operator in such a way that he does not have to shift his eyes from the suspected leak point to observe the various visual outputs on the housing of the instrument.

Having described the structural components which comprise the leak detection instrument 10 according to the exemplary embodiment of the present invention, the principal features of the electronic circuitry for accomplishing these various integrated detection capabilities will be discussed with reference to the block diagrams of FIGS. 12–14(c). However, the ordinarily skilled artisan familiar with the pertinent prior art, as it relates to gas sensor technologies, should recognize that numerous teachings exist for separately detecting various characteristics of gases, or families of gases, as well as the processing of detection signals attendant therewith. The same holds true for AE sensing technologies. Accordingly, the integration of these sensing technologies and their processing into a single instrument package, albeit heretofore unrecognized in the art, need only be discussed diagrammatically to be enabling to the ordinarily skilled artisan.

Figure 12:
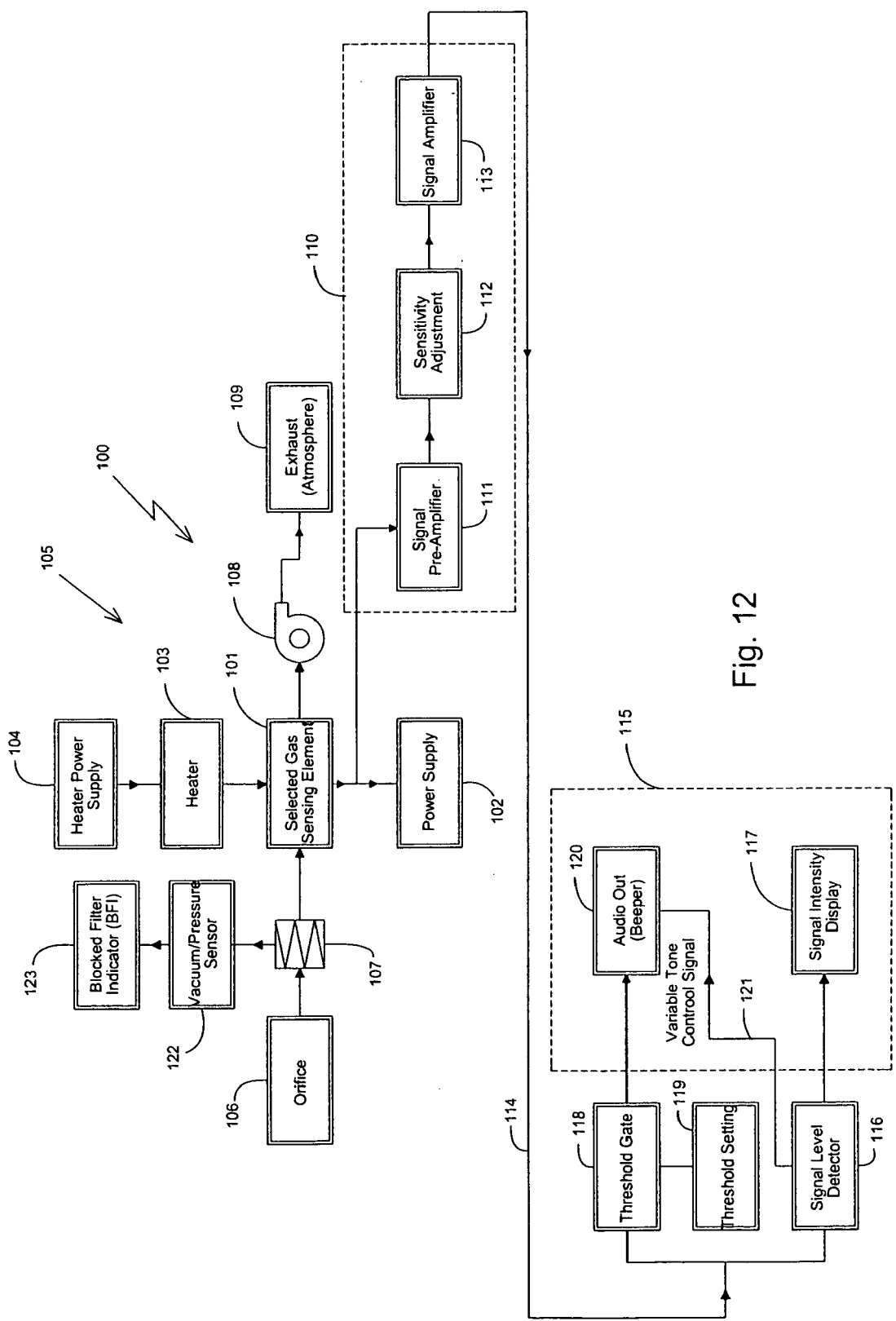
FIG. 12 is a block diagram illustrating, for the most part, the principle features associated with known instruments which employ a selected type of gas sensor for gas detection.

With this in mind, initial reference is made to the block diagram of FIG. 12 which, for the most part, illustrates the principal features associated with known gas detection instruments which incorporate a gas sensor. Representative gas detection instrument 100 includes a selected gas sensing element 101, which can be of any appropriate type for use in detecting particular gases or particular families of gases. To this end the selected gas sensing element 101 can, for example, be a coil construction such as described in U.S. Pat. No. 5,932,176 to Yannopoulos which is reactive to the presence of halogen gases. Sensing element 101 is powered by an appropriate bias voltage power supply 102 and is heated by a heater 103 which has its own power supply 104. A gas sensor 105 is, thus, comprised of those components which make up blocks 101–104, and this gas sensor is used in a gas detection instrument 100 which includes additional processing circuitry components as diagrammatically shown in FIG. 12.

An orifice 106 is provided through the instrument's housing so that atmospheric gas is communicated to the selected gas sensing element 101. The atmospheric gas passes through a filter element 107 that is interposed between orifice 106 and sensor 101. The atmospheric gas is drawn past sensing element 101 by a vacuum pump 108 and then exhausted to the atmosphere in any appropriate manner as shown by block 109. The signal generated by the gas sensor 105 is passed to front-end processing circuitry 110 which may include a signal pre-amplifier 111, sensitivity adjustment circuitry 112 and signal amplifier 113. After passing through processing block 110, the conditioned gas detection signal is then sent to output circuitry 115 to provide either visual or audible output to a user. For visual output, the conditioned signal 114 is passed through a signal level detector 116 and then to an appropriate signal intensity display 117 which can be an array of LEDs, a numeric display or the like. Conditioned signal 114 also passes through a threshold gate 118 controlled by an appropriate threshold setting 119 and is then passed to a speaker element, such as a beeper 120 to provide the audio output. A tone control signal 121 may also be passed to the beeper 120 from the signal level detector 116 so that intensity of the detected gas is indicated to the user via different tonal outputs.

At this point, the gas detection instrument 100 corresponds to those known in the art. However, two additional features can be provided for instrumentation 100 which it is believed are not known in the art. These include a vacuum/pressure sensor 122 and a block filter indicator (BFI) 123 which are each associated with filter element 107. Vacuum/pressure sensor 122 acts as a switch that produces a blocked filter indicator signal when the filter element 107 becomes contaminated and its efficacy reduced below a selected threshold which can be set to one's preference. This BFI signal can then be processed by the processing circuitry for adjustments and alarms as desired. While utilization of vacuum/pressure sensing devices in connection with filter elements is known, it is not believed that this has been incorporated in existing gas detection instruments.

Figure 13:
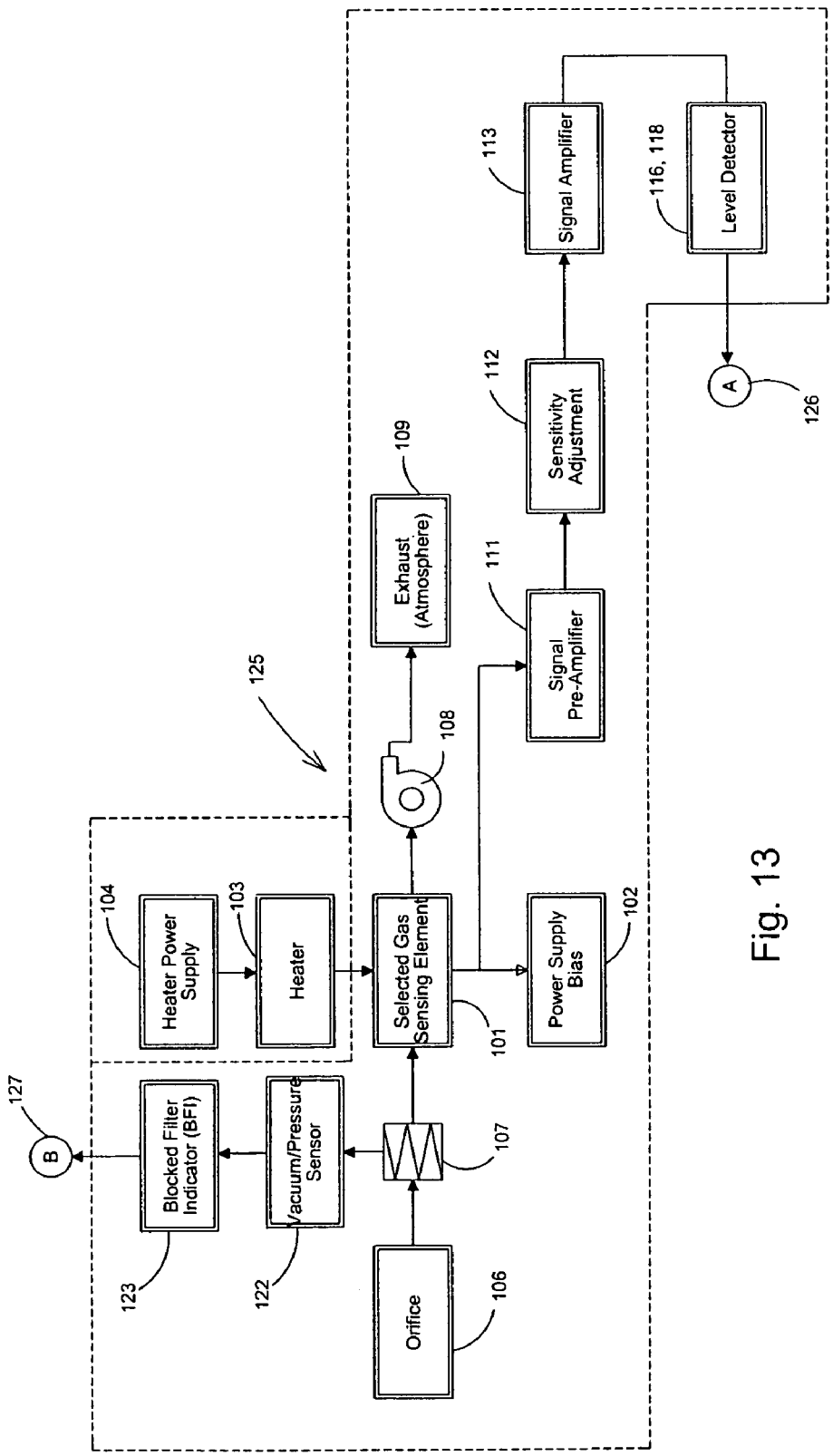
FIG. 13 is a block diagram showing principle components of a gas sensor block which may be incorporated into a leak detection instrument according to the present invention.

With reference now to FIG. 13, it may be appreciated that a gas sensor block 125 may be defined as those components of a typical gas detection instrument, such as that shown in FIG. 12, which comprise the selected gas sensor and its front end processing, but not the outputs. Depending on the particular type of gas sensor employed, it may or may not incorporate the heater 103 and its associated power supply 104. As such, gas sensor block 125 as represented by the dashed line in FIG. 13 may optionally include or exclude these components depending on the sensor type. For example, heating components would be employed for a chemical properties leak detector (CPLD), but not for a photo ionization detector (PID). Regardless of the particular type of sensor block(s) employed, it can be characterized as having a first output 126 as represented by node "A" in FIG. 13 which corresponds to a level, in ppm, of the conditioned gas detection input signal produced by the front end processing circuitry, as well as a second output 127 as represented by node "B" which corresponds to the block filter indicator (BFI) signal.

Figure 14A:
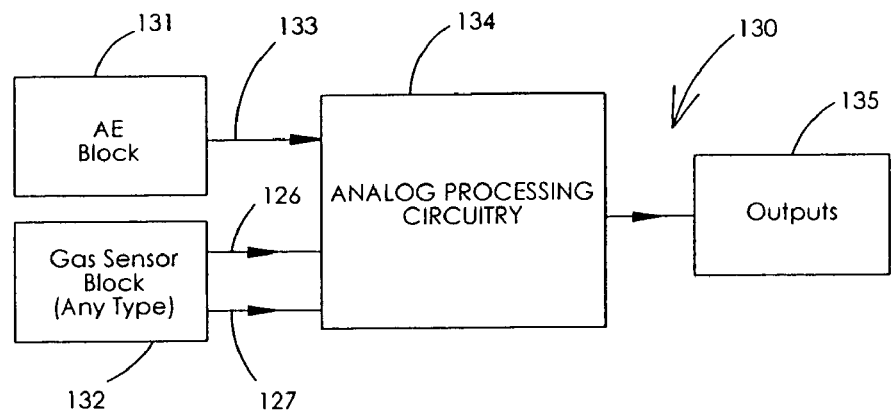
FIG. 14(a) illustrates, in block diagram form, principle aspects of a multi-functional leak detection instrument according to one embodiment of the present invention which incorporates analog processing circuitry.

FIG. 14(a) thus diagrammatically represents principle aspects of a leak detection instrument 130 contemplated by the present invention which only utilizes analog processing circuitry. Detection instrument 130 includes an acoustic emissions (AE) sensor block 131 and at least one gas sensor block 132. AE block 131 transmits to analog processing circuitry 134 a conditioned ultrasonic signal 133. Conditioned ultrasonic signal 133 preferably corresponds to the input signal 32 produced at the output of the amplification and filter circuitry 22 as shown and discussed with reference to FIG. 2 of my earlier U.S. Pat. No. 4,432,755, issued Jul. 11, 1995, the disclosure of which is incorporated by reference. Analog processing circuitry 134 processes both the conditioned ultrasonic signal 133 from AE block 131, as well as the signals 126 and 127 from the gas sensor block 132 in order to generate one or more outputs 135 which can be any appropriate combination of visual and audible indicators. The ordinarily skilled artisan should, thus, appreciate that the analog processing circuitry generally represented as block 134 in FIG. 14(a), in addition to incorporating those features discussed in FIG. 12 with reference to the gas sensor, incorporates processing features such as those discussed in my earlier '755 patent. In the alternative, the ultrasonic portion of the analog processing could be accomplished as discussed in either of my earlier U.S. Pat. No. 5,103,675 or U.S. Pat. No. 5,436,556.

Figure 14B:
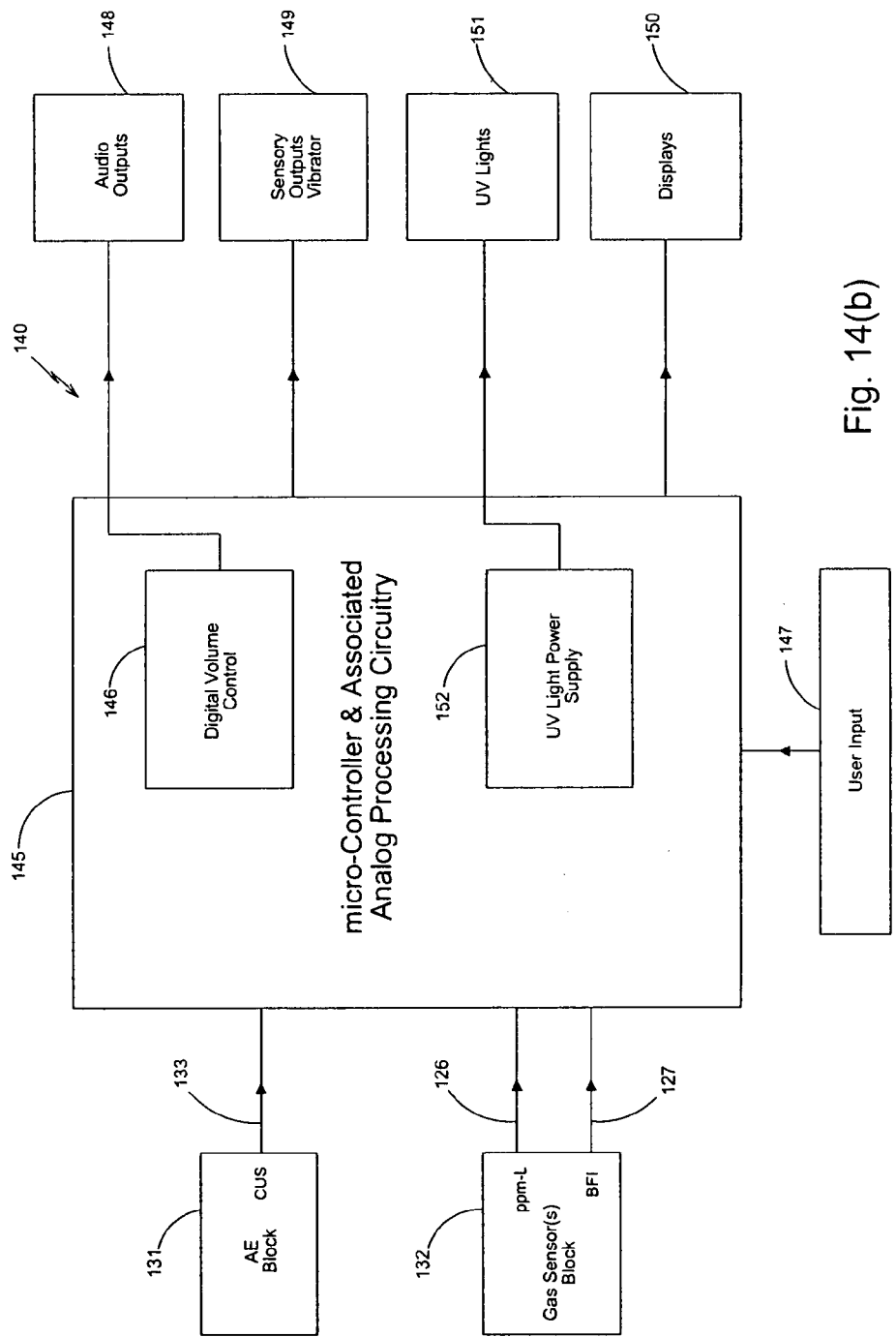
FIG. 14(b) illustrates, in block diagram form, principle aspects of a multi-functional leak detection instrument according to another embodiment of the present invention which incorporates both analog and digital signal processing.
Figure 14C:
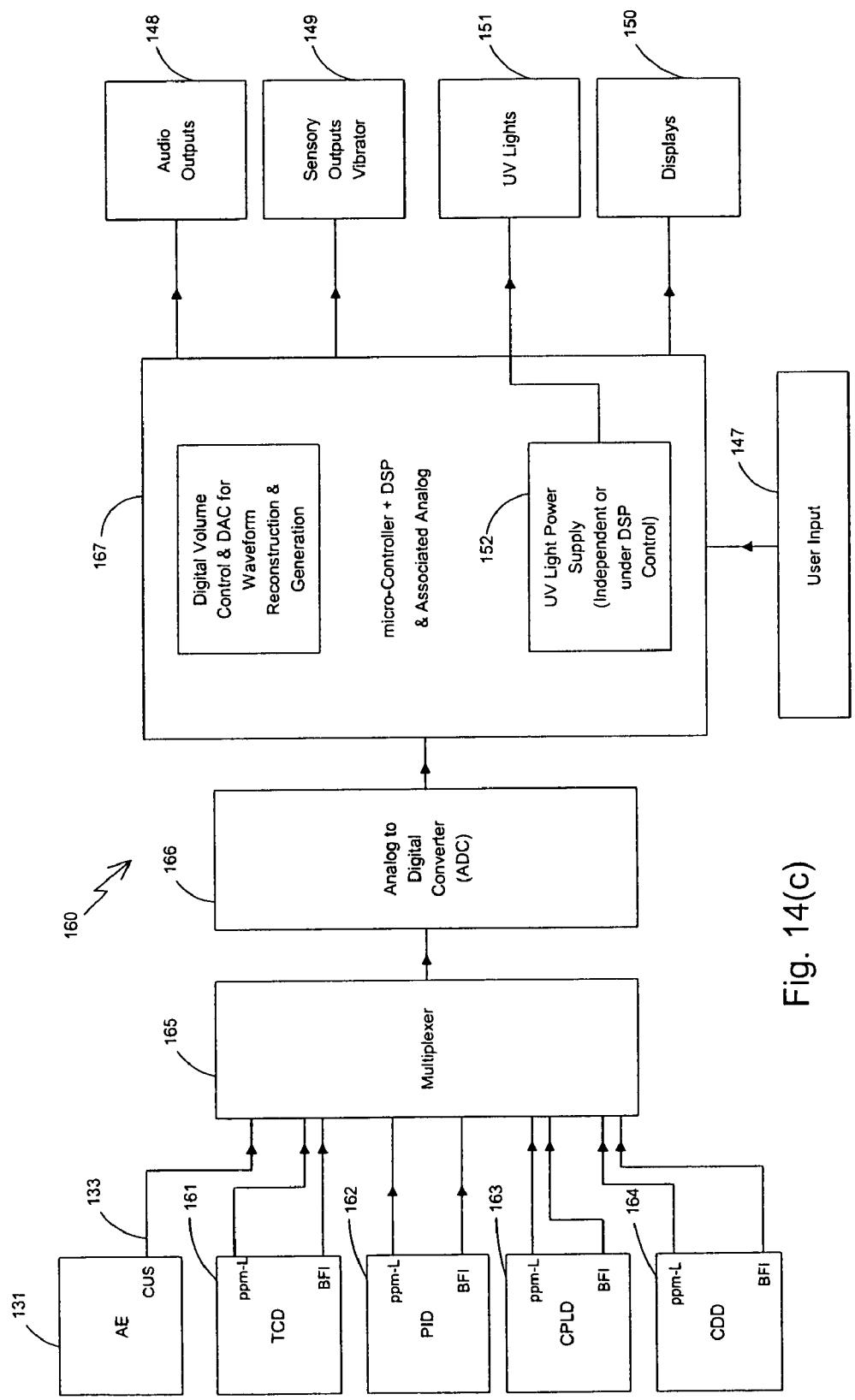
FIG. 14(c) illustrates, in block diagram form, principle aspects of a multi-functional leak detection instrument according to yet another embodiment of the present invention which incorporates analog and digital signal processing, as well as a digital signal processor (DSP)

FIG. 14(b) diagrammatically illustrates principle aspects of a leak detection instrument 140 which also incorporates an AE block 131 with associated conditioned ultrasonic signal 133, as well as one or more gas sensor blocks 132, each generating an appropriate conditioned gas detection input signal 126 and a BFI signal 127. Here, however, leak detection instrument 140 incorporates a combination of both analog and digital processing circuitry 145 which incorporates a digital volume control 146 and which is responsive to user input 147 to produce one or more outputs, such as audible output 148, vibrational output 149 or visual output 150. User input 147 might entail, for example sensitivity settings for each of the sensors, threshold limits, alarm points, a volume level for the audio output, dimming level for the visual displays and, in general, control of the instrument features. The analog/digital processing circuitry 145 in FIG. 14(b) can particularly incorporate digital processing circuitry for the AE block as discussed in my earlier U.S. Pat. No. 6,058,076 or U.S. Pat. No. 6,163,504, each of which is incorporated by reference. Optionally also, detection instrument 140 may provide UV illumination via UV lights 151, having power thereto provided by an associated UV light power supply 152 which forms part of the analog/digital processing circuitry 145. Finally, FIG. 14(c) illustrates, in block diagram form, principle aspects of a third representative embodiment of a multi-functional leak detection instrument 160 which is particularly adapted to receive a plurality of sensor inputs from an acoustic emissions (AE) block 131 and a plurality of different types of gas sensor blocks, such as a thermal conductivity detector (TCD) block 161, a photo ionization detector (PID) block 162, a chemical properties detector (CPD) block 163 and a corona discharge detector (CDD) block 164, to name a few representative ones. As shown in FIG. 14(c), each of these gas sensor blocks 161–164 generates an associated signal indicating a level (preferably in ppm) of the respective conditioned gas detection signal, as well as an associated BFI signal. A suitable multiplexer 165 receives as input each of these signals from the gas sensor blocks, as well as the conditioned ultrasonic signal 133 from the AE block 131. Multiplexer 165 outputs to an analog to digital converter (ADC) 166 which provides its input to processing circuitry 167. As before, user input 147 can be provided and various outputs 148–151 can be provided. Here, however, the processing circuitry 167, in addition to suitable analog circuitry and a micro-controller for achieving digital control and processing, may employ an integrated digital signal processor (DSP). The DSP provides various capabilities, as would be recognized by those skilled in the art, including digital volume control and digital to analog conversion (DAC) for the received waveforms, as well as waveform reconstruction and generation. This functionality can be used to provide any of a variety of control capabilities to the various outputs. In addition, as also shown in FIG. 14(c) the UV light power supply 152 may be either independent or under control of the DSP.

Figure 15A:
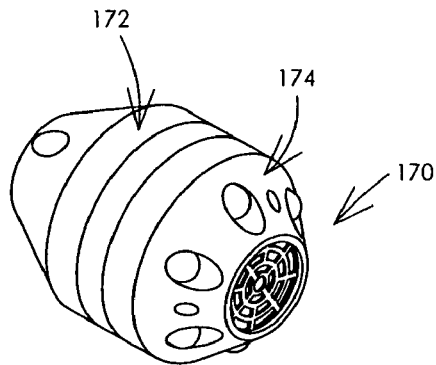
FIG. 15(a) is a perspective view of a second exemplary embodiment for an AE sensor housing of the present invention.
Figure 15B:
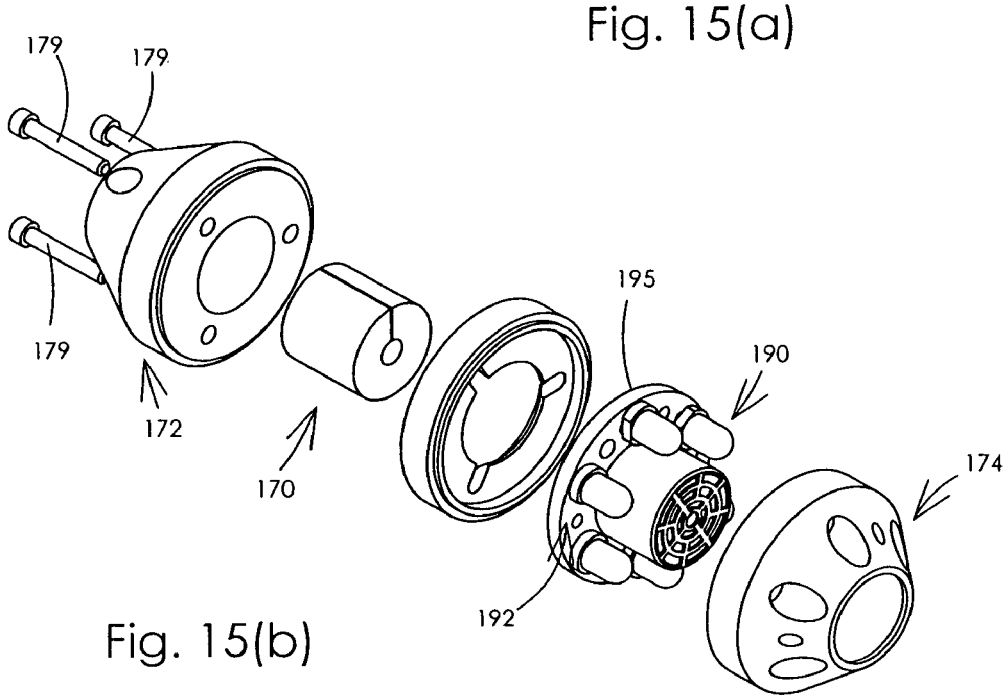
FIG. 15(b) is an exploded perspective view of the AE sensor housing of FIG. 15(a)

Since the present invention relates to the integration of a variety of two or more detection technologies (e.g. AE, gas, UV) into a single instrument, various alternative sensor housings that are specifically envisioned, and which may be used as part of a multi-functional leak detector, will now be briefly discussed with reference to FIGS. 15(a)–20(b). Turning initially to FIGS. 15(a) and 15(b), an alternative AE sensor housing 170 is shown which is identical to that described above with reference to FIGS. 5 and 6, except that it does not incorporate the visible LEDs. As such, AE sensor housing 170, as above in the exemplary embodiment, includes a pair of end caps 172 and 174 which are attached by appropriate threaded fasteners 179, a hydrophilic filter 180 and a circuit board assembly 190. It should be appreciated, though, since the downstream face 195 of the circuit board assembly's substrate 192 does not have surface mounted visible LEDs, the AE sensor housing 170 similarly does not incorporate the optically clear annular ring so that, here, the end caps 172 and 174 are in abutting relationship to one another when the AE sensor housing 170 is in the assembled state shown in FIG. 15(a).

Figure 16A:
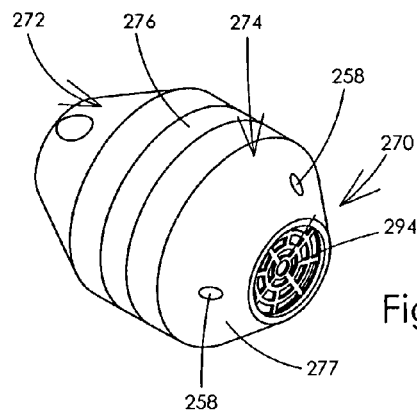
FIG. 16(a) is a perspective view of a third exemplary embodiment for an AE sensor housing of the present invention.
Figure 16B:
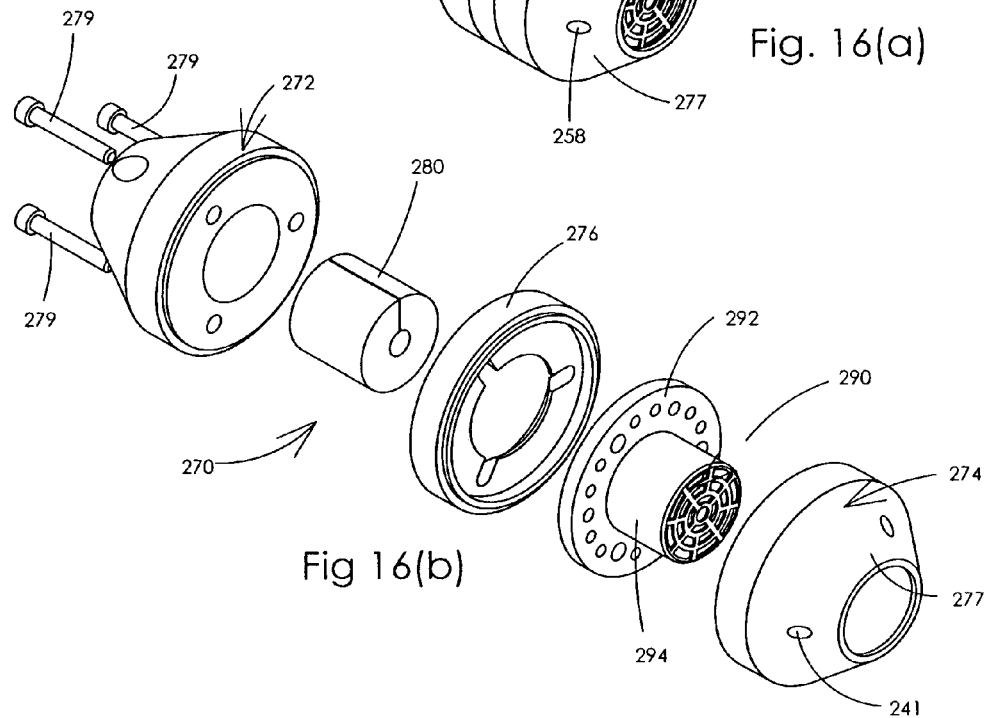
FIG. 16(b) is an exploded perspective view of the AE sensor housing of FIG. 16(a)
Figure 17A:
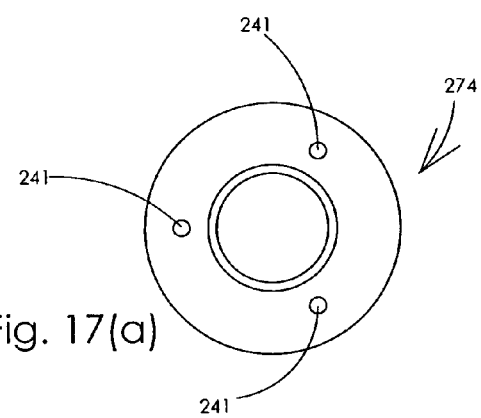
FIG. 17(a) is a front plan view of one of the end caps for the AE sensor housing shown in FIGS. 16(a) and 16(b)
Figure 17B:
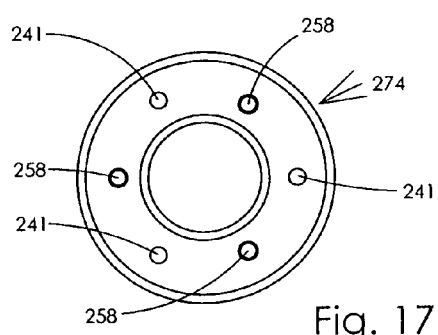
FIG. 17(b) is a rear plan view of the end cap of FIG. 17(a)

In FIGS. 16(a) and 16(b), an AE sensor housing 270 is shown which incorporates visible LEDs, but not UV LEDs. AE sensor housing 270, thus, includes end caps 272 and 274 which are mounted by threaded fasteners 279, and a hydrophilic filter 280. However, the circuit board assembly 290, while having an onboard AE sensor 294, does not have any UV LEDs surface mounted to its substrate 292, such that there is no need for the provision of UV alignment bores formed through upstream end cap 274. As such, end cap 274 as shown in FIGS. 16(a), 16(b), 17(a) and 17(b) includes air passageway bores 241 and threaded bores 258 for the faster 279, but no UV LED apertures through its frustoconical portion 277.

Figure 18A:
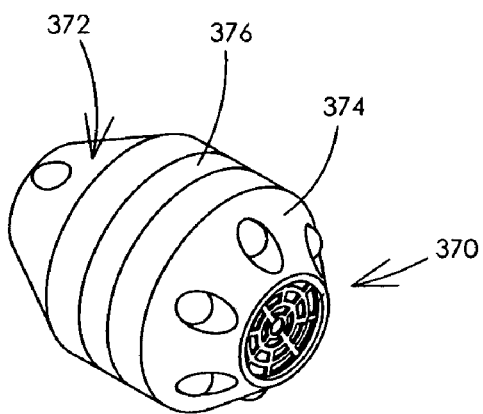
FIG. 18(a) is a perspective view of a fourth exemplary embodiment for an AE sensor housing of the present invention.
Figure 18B:
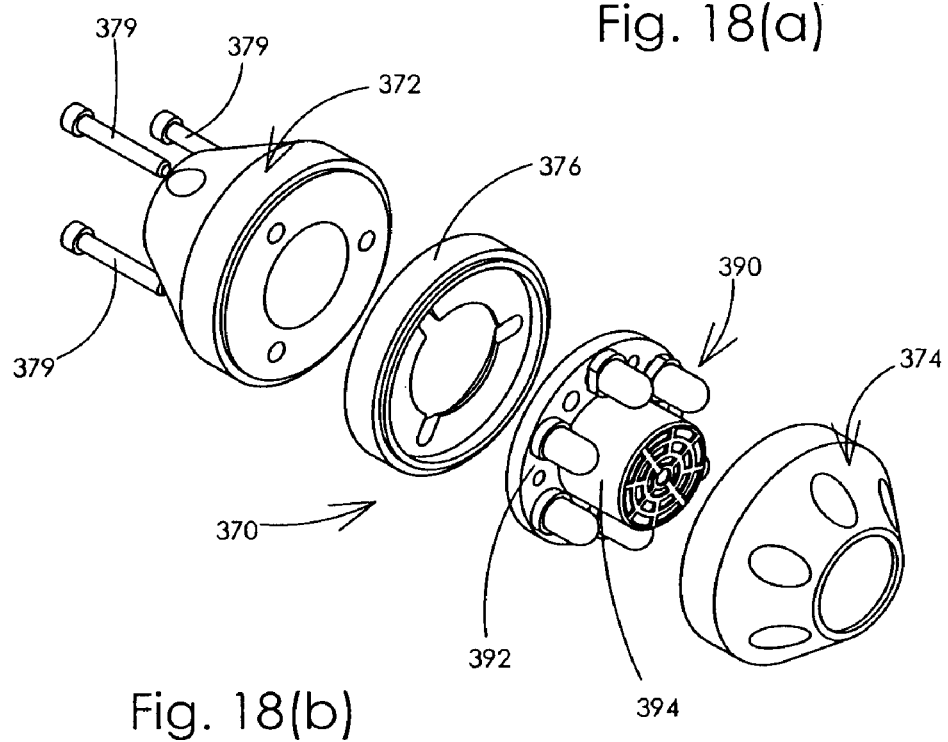
FIG. 18(b) is an exploded perspective view of the AE sensor housing of FIG. 18(a)

Still, another embodiment for an AE sensor housing 370 is shown in FIGS. 18(a) and 18(b). Here AE sensor housing 370 is not intended for use with a leak detection instrument that incorporates a gas sensor. Rather, AE sensor housing 370 provides ultrasonic detection capabilities, UV illumination capabilities and visible light illumination capabilities. To this end, it incorporates a pair of end caps 372 and 374 which are threadedly attached by fasteners 379, an annular ring 376 and a circuit board assembly 390. End cap 372 and annular ring 376 are constructed as discussed above with reference to the exemplary embodiment of the leak detector of the present invention. However, since there are no gas detection capabilities in the embodiment of FIGS. 18(a) and 18(b), there is no corresponding filter element, and there are no air passageway bores formed through either the circuit board assembly's substrate 392 or upstream end cap 374.

Figure 19A:
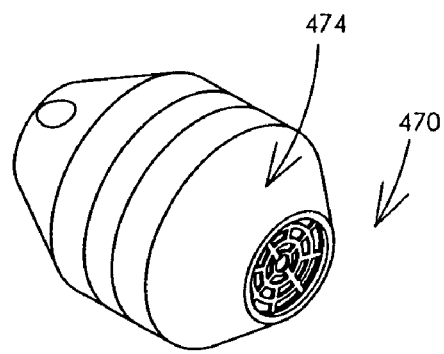
FIG. 19(a) is a perspective view of a fifth exemplary embodiment for an AE sensor housing of the present invention.
Figure 19B:
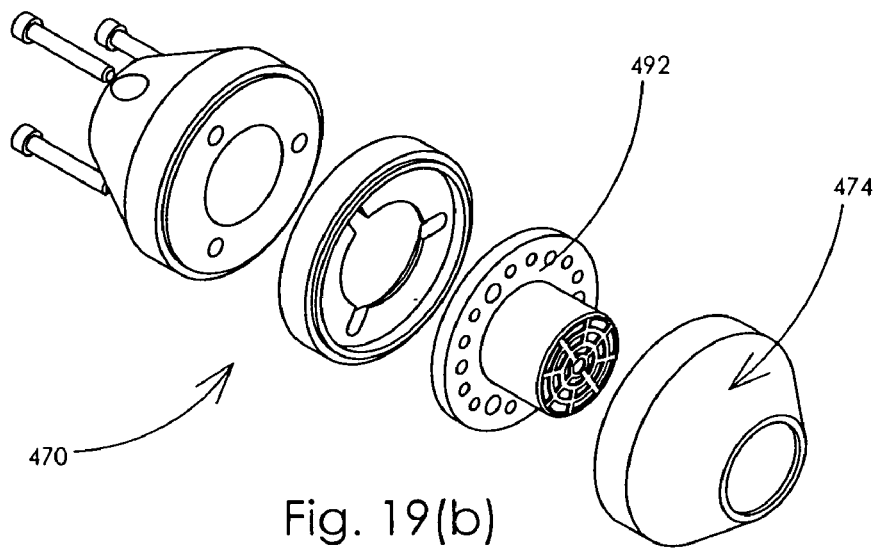
FIG. 19(b) is an exploded perspective view of the AE sensor housing of FIG. 19(a)

Yet another alternative embodiment for an AE sensor housing 470 is shown in FIGS. 19(a) and 19(b). Here, AE sensor housing 470 incorporates ultrasonic detection capabilities and visible light emissions capabilities, but is not adapted for use with a leak detector which incorporates gas detection capabilities or UV illumination capabilities. As such, there are no UV LEDs mounted to substrate 492 and there are no correspondingly aligned UV LED ports formed in upstream end cap 474. Similarly, there are no air passageway ports formed through either upstream end cap 474 or the circuit board assembly's substrate 492.

Figure 20A:
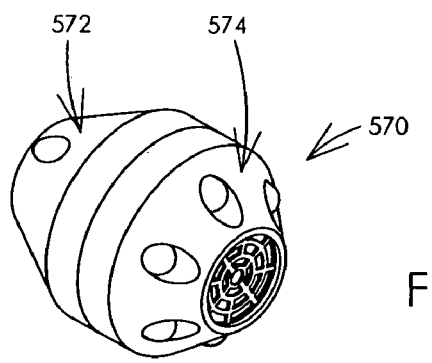
FIG. 20(a) is a perspective view of a sixth exemplary embodiment for an AE sensor housing of the present invention.
Figure 20B:
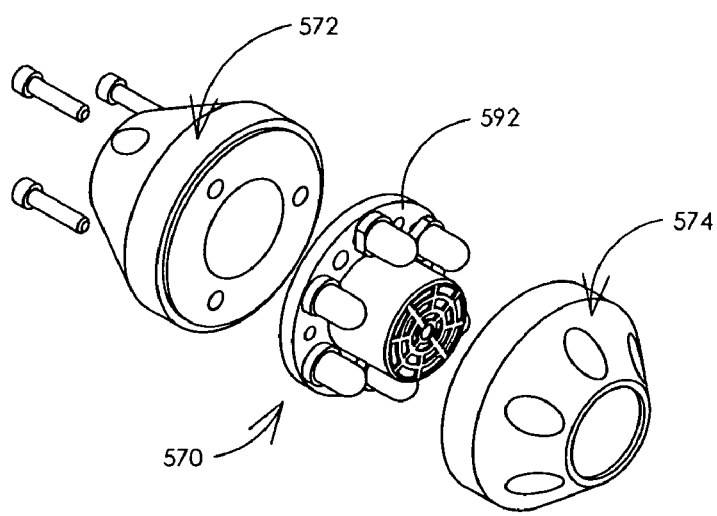
FIG. 20(b) is an exploded perspective view of the AE sensor housing of FIG. 20(a)
Figure 21:
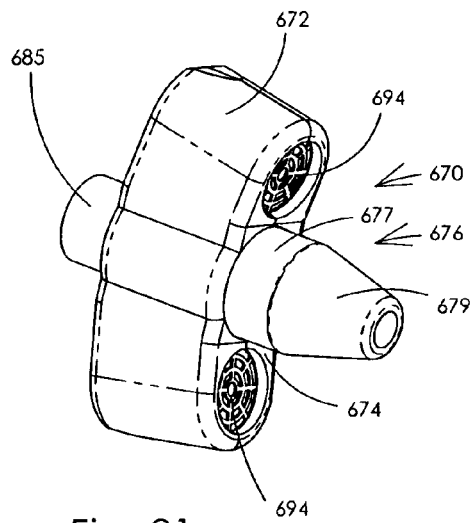
FIG. 21 is a perspective view of a sixth exemplary embodiment for an AE sensor housing of the present invention.
Figure 22:
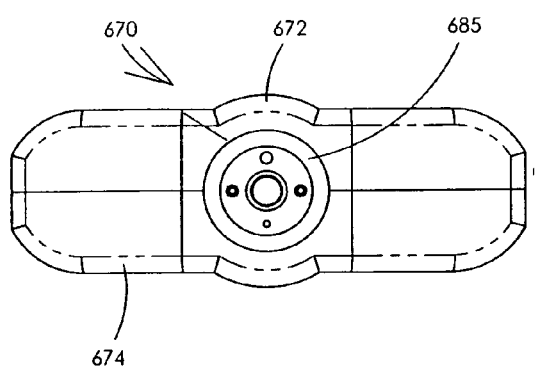
FIG. 22 is a rear plan view of the AE sensor housing of FIG. 21.
Figure 23:
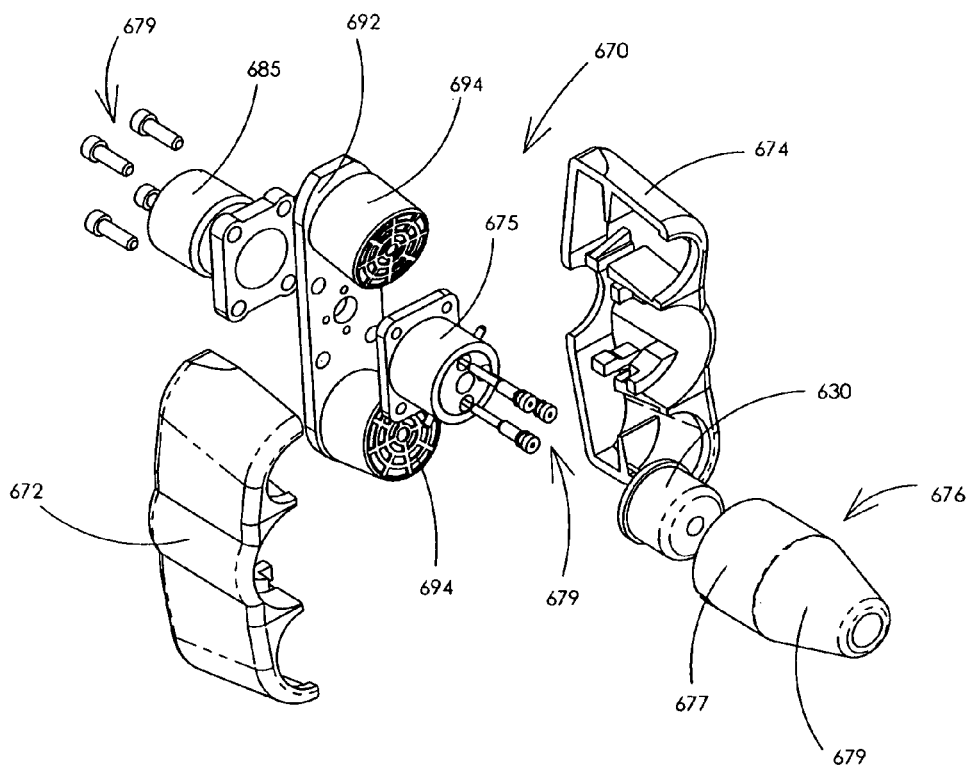
FIGS. 23(a) and 23(b) are exploded perspective views of the AE sensor housing shown in FIG. 21.
Figure 23:
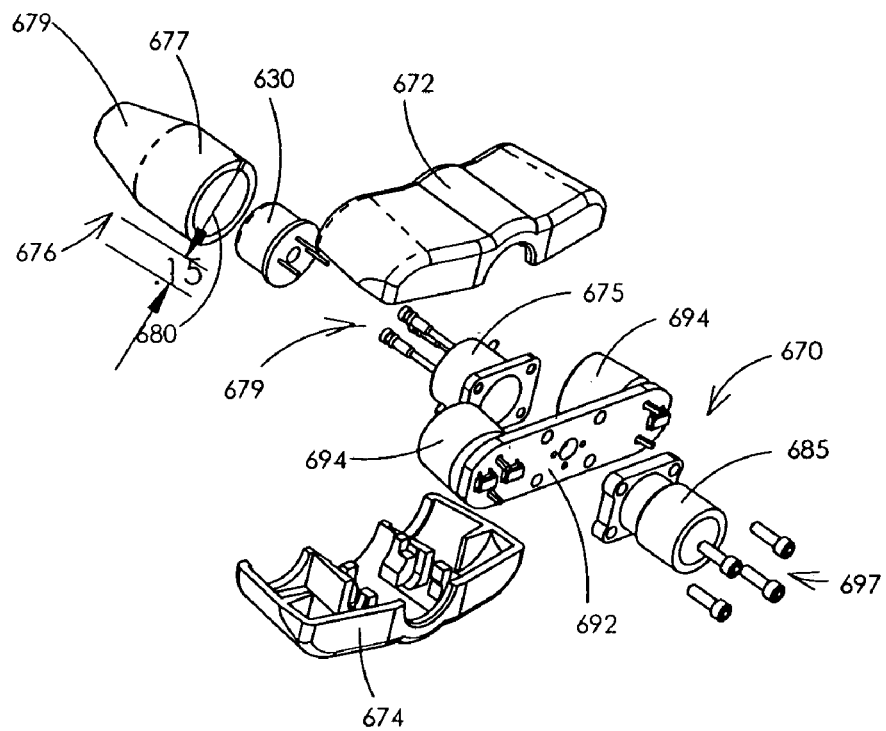

Another alternative embodiment for an AE sensor housing 570 is shown in FIGS. 20(a) and 20(b). Here, AE sensor housing 570 has ultrasonic detection capabilities and UV emission capabilities, but does not have visible light emitting capabilities and is not adapted for use with a leak detector which incorporates a gas sensor. As such, AE sensor housing 570 does not have any surface mounted visible LEDs on substrate 592, and there is no annular ring interposed between end caps 572 and 574, or an internal filter element. In addition, there are no air passageway ports formed through either the circuit board assembly's substrate 592 or upstream end cap 574.

FIGS. 21–23(b) illustrate a final alternative embodiment for an AE sensor housing 670. Here, it may be seen that AE sensor housing 670 accommodates both a pair of AE sensors 694 and 694', as well as a gas sensor 630. Accordingly, it may be appreciated that this embodiment contemplates not only the provision of a plurality of sound sensors, but the provision of a gas sensor disposed in the sensor housing so that it is not necessary to place the gas sensor within the instrument housing as shown in previous figures. In addition, while sensor housing 670 would be used with a detection instrument incorporating an onboard pump as discussed above, the ordinarily skilled artisan would appreciate that location of the pump could likewise be located in the sensor housing 670, if desired.

As shown, AE sensor 694 and 694' are mounted to an elongated, generally oval circuit board 692 in such a manner that they are aligned so that their axes intersect the axis of the gas sensor. Also mounted on the upstream surface of circuit board 692, between AE sensors 694 and 694', is a socket that includes pins 679 for the gas sensor 675. Socket 675 is fastened to a support 685 that is disposed on the downstream face of circuit board 692. Socket 675 and support 685 are attached by fastening elements 679'. Socket 675 accommodates gas sensor 630 so that the gas sensor 630 is positioned centrally between and forwardly of the AE sensors. Support 685 is sized and adapted to accommodate an appropriate gooseneck extension as shown in earlier figures.

As best shown in FIG. 23(b), a nose cone 676, which includes a cylindrical portion 677 and a frustoconical portion 679, is positioned on socket 675 by aligning its diametrically opposed slots with the diametrically opposed prongs which protrude from socket 675. As also shown FIG. 23(b), a hydrophilic filter 680 is received within cylindrical piece 677 upstream of gas sensor 630. Left and right housing pieces 672 and 674, respectively, are configured to attach to one another by any appropriate means and accommodate the circuit board sub-assembly once the various components are mounted directly or indirectly thereto.

It may be seen in the exploded perspective views of FIGS. 23(a) and 23(b) that the various centrally aligned pieces associated with AE sensor housing 670 are ported members to create a gas flow passageway through the housing 670, and this passageway necessarily communicates with the gooseneck attachment when mounted thereto. In addition, as also discussed above with reference to earlier figures, these ported members accommodate the necessary wiring (not shown) for the various circuitry components so that electrical signals can be transmitted from the sensor housing 670 to the instrument housing. Desirable front end processing, such as pre-amplification of the signals generated by the AE sensors 694 and 694', as well as possibly the gas sensor 630, can be accomplished by various IC chips surface mounted to the downstream facing surface of circuit board 692, as generally illustrated in FIG. 23(b).

With the above discussion in mind relating to the leak detector of the present invention, and its various alternative embodiments, it should be readily appreciated that the present invention also contemplates a method of monitoring a device to ascertain leakage of a target gas therefrom. This method broadly comprises the provision of a gas sensor and an AE sensor as discussed above. The gas sensor is exposed to the target gas to generate a gas detection input signal, and the AE sensor is exposed to airborne sound attendant with leakage of the target gas to generate a sound detection input signal. Both signals are processed to produce at least one output in response thereto, and perceptible output is displayed in response to the output signal. Preferably, the sound detection input signal generated by the AE sensor and the gas detection input signal generated by the gas sensor are parallel processed. Further, the methodology also contemplates the creation of a vacuum to draw the target gas along an gas flow passageway from an upstream location that is in a vicinity of a suspected leak, preferably through a hydrophilic filter, and towards a downstream location whereby the target gas encounters the gas sensor. The method also contemplates visibly illuminating an area in the vicinity of the upstream location and/or illuminating the area with ultraviolet light thereby to cause the substance to fluoresce.

Figure 24:
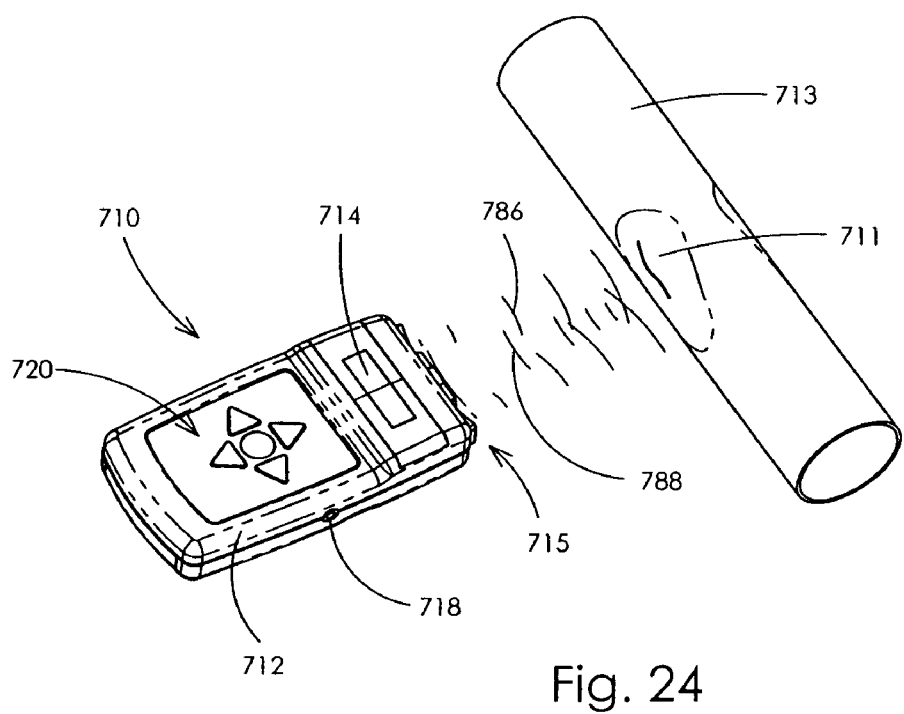
FIG. 24 is a perspective view of another exemplary embodiment for a detection instrument of the present invention, and showing it in use to detect the presence of a gaseous substance, or it's residue, on a conduit.
Figure 25:
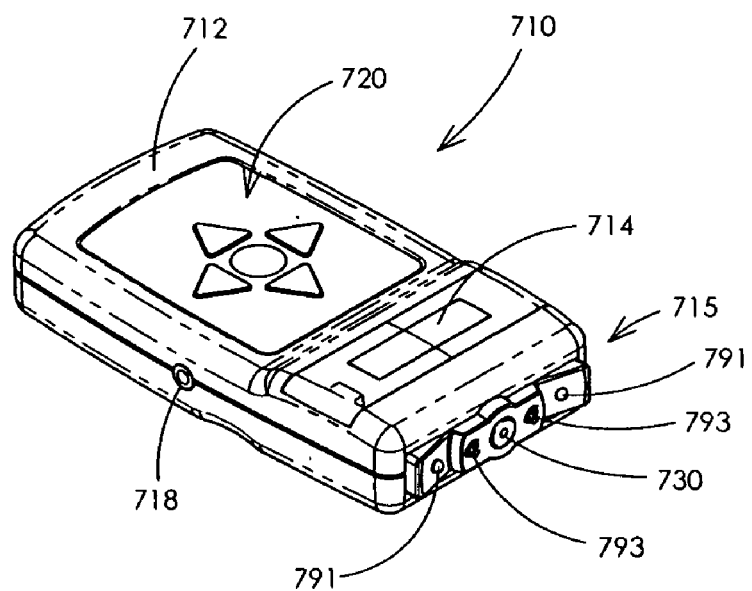
FIG. 25 is a perspective view of the detection instrument shown in FIG. 24.

As discussed above, the integration of various types and combinations of sensors into a single instrumentation are envisioned, aside from the AE sensor and gas sensor combination which is the subject of the claims of the present application. The remaining figures are provided to visually illustrate at least two other types of detection instruments which are specifically contemplated. A first such type is shown in FIGS. 24 and 25. Here, detection instrument 710 is particularly suited for detecting the presence of a gas or its residue. To this end, one representative environment for using instrument 710 is shown in FIG. 24 where a gaseous substance 711, or its residue, is found on a tubular conduit 713.

Detection instrument 710 generally incorporates a housing 712 which supports a visual display 714 for providing suitable visual output pertaining to characteristics of the received detection signals. Audible output is obtained by way of earphones (not shown) which are electrically connected to the housing's internal circuitry via headphone jack 718. A plurality of push button switches 720 are provided to turn the unit on and off, as well as providing various modes of operation and selective adjustment of sensitivity levels, volume, etc. The various design capabilities and unit configurations would be within the purview of the ordinarily skilled artisan.

To detect the gaseous substance 711, detector 710 may support a plurality of emitters and detectors situated symmetrically about the front end 715. These are represented in FIG. 25. Left and right emitters, in the form of UV LEDs 791 and 791' irradiate the target tube 713 with UV radiation as represented by emission waves 786 shown in FIG. 24. This causes the gaseous substance 711 to fluoresce and generate reflection waves 788 which can be detected by left and right detectors, such photodiodes 793 and 793', respectively CCDs could also be used for detection as opposed to, or in conjunction with the photodiodes. Optionally, a centrally disposed gas sensor 730 may also be provided. Gas sensor 730 can be of the various types discussed above which operates alone, or in conjunction with an onboard pump, to create a gas sniffer.

Figure 26:
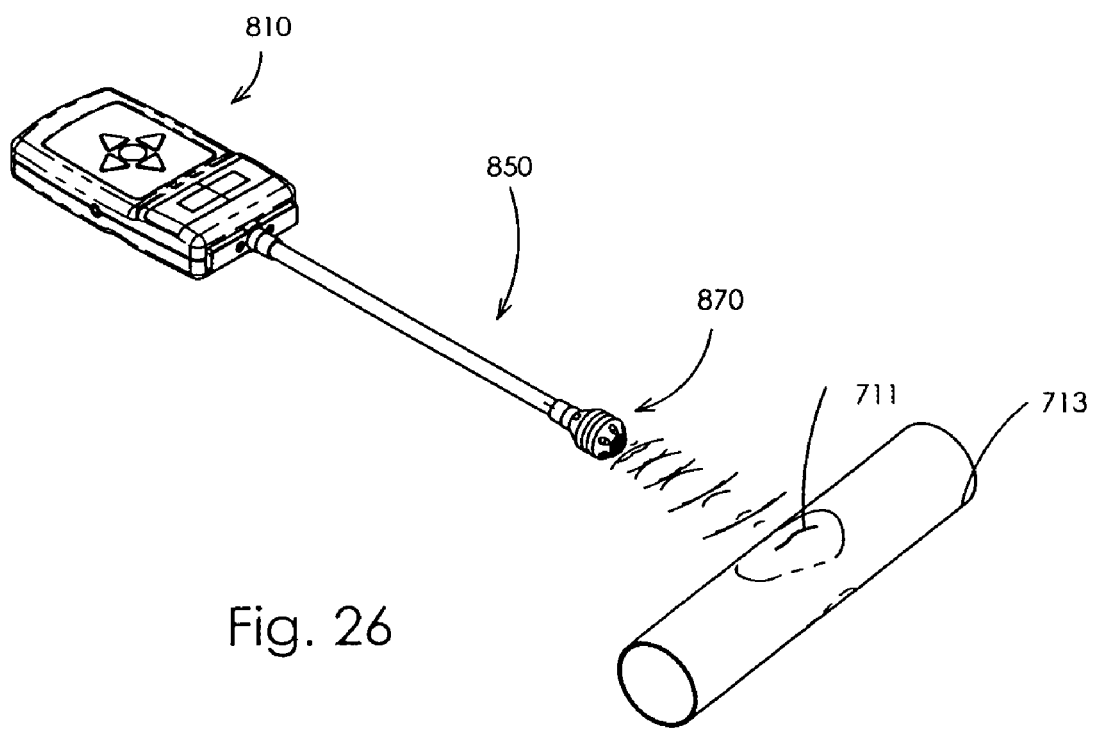
FIG. 26 is a perspective view of yet another exemplary embodiment for a detection instrument according to the present invention, and showing it in use to detect the presence of a gaseous substance, or it's residue, on a conduit.

FIG. 26 illustrates an alternative construction for a detection instrument similar to that of FIGS. 24 & 25. Here, a sensor housing 870 is supported relative to an instrument housing 812 by an extension member 850 so that the UV LEDs and photodiodes/CCDs are displaced from the optional gas sensor.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A leak detection instrument for monitoring gas leakage from a device, comprising:
   a. an instrument housing;
   b. a gas sensor supported relative to said instrument housing and operative upon exposure to a selected gas to generate a corresponding gas detection input signal;
   c. a gas pump disposed within said instrument housing and operative upon actuation to draw the selected gas toward said gas sensor;
   d. an acoustic emissions (AE) sensor supported relative to said instrument housing and operative upon exposure to sound attendant with leakage of the selected gas to generate a corresponding sound detection input signal;
   e. processing circuitry for receiving said gas detection input signal and said sound detection input signal and for producing at least one output signal in response thereto; and
   f. an output device for producing perceptible output in response to said output signal.

2. A leak detection instrument according to claim 1 wherein said gas sensor is a chemical properties leak detector (CPLD).

3. A leak detection instrument detector according to claim 1 wherein said gas sensor is selected from a group consisting of a chemical properties leak detector (CPLD), a thermal conductivity detector (TCD), a photo-ionization detector (PID), a laser interferometer (LID), a corona discharge detector (CDD), a microelectromechanical (MEMS) based detector, a chemical resistor sensor (CRS), and a surface acoustic wave (SAW) detector.

4. A leak detection instrument according to claim 1 wherein said AE sensor is supported relative to said instrument housing by an AE sensor mounting assembly.

5. A leak detection instrument according to claim 1 wherein said AE sensor is supported relative to said instrument housing by an AE sensor mounting assembly.

6. A leak detection instrument according to claim 4 wherein said AE sensor mounting assembly includes an elongated tubular extension having a proximal end removably attached to said instrument housing and extending from said proximal end to terminate at a distal end, and including an AE sensor housing disposed on said distal end.

7. A leak detection instrument according to claim 6 wherein said gas sensor is disposed within said instrument housing upstream of said pump, and wherein said tubular extension is a flexible member defining an airflow passageway between said AE sensor and said gas sensor.

8. A leak detection instrument according to claim 7 including a filter interposed between said AE sensor and said gas sensor.

9. A leak detection instrument according to claim 8 including a vacuum switch operative to monitor said filter and to produce a blocked filter indicator (BFI) signal for processing by said processing circuitry when said filter becomes contaminated and its efficacy reduced.

10. A leak detection instrument according to claim 7 wherein said pump is operative upon actuation to draw the target gas from an upstream end of said AE sensor mounting assembly, in a downstream direction along the airflow passageway, and toward said gas sensor.

11. A leak detection instrument according to claim 6 wherein said AE sensor is a micro-phonic element supported within an interior of said AE sensor housing in electrical communication with said processing circuitry.

12. A leak detection instrument according to claim 11 including a plurality of LEDs supported within said AE sensor housing in electrical communication with said processing circuitry.

13. A leak detection instrument according to claim 12 wherein said AE sensor and said LEDs are mounted on a common circuit board.

14. A leak detection instrument according to claim 1 wherein said processing circuitry is operative to parallel process said gas detection input signal and said sound detection input signal.

15. A leak detection instrument according to claim 1 wherein said processing circuitry includes at least one processing component selected from a group consisting of a microprocessor, a microcontroller and a digital signal processor (DSP).

16. An acoustic emissions (AE) sensor mounting assembly adapted for connection to a scientific instrument that includes an instrument housing, processing circuitry for receiving an input sound detection signal and producing an output signal in response thereto, and an output device for generating perceptible output in response to the output signal, said AE sensor mounting assembly comprising:

a. a mounting member formed as an elongated, tubular extension that is adapted to releaseably connect to the instrument housing, said mounting member formed to include a gas flow passageway between respective ends thereof;

b. an AE sensor housing supported by said mounting member, said AE sensor housing including a pair of bored end caps joined together to substantially surround an AE sensor housing interior, and a through bore in communication with the gas flow passageway;

c. an AE sensor disposed within said AE sensor housing and adapted to be placed in electrical communication with said processing circuitry, said AE sensor being a micro-phonic element mounted on a circuit board that is supported within the AE sensor housing interior, said AE sensor operative upon exposure to sound attendant with gas leakage from a device to generate the input sound detection signal for processing; and d. a plurality of ultraviolet LEDs mounted on said circuit board, said ultraviolet LEDs operative upon emission of ultraviolet light to cause an appropriately dyed target gas, or its residue, in a vicinity of said AE sensor housing to fluoresce.

17. An AE sensor mounting assembly according to claim 16 wherein said elongated mounting member is a flexible tube having a proximal end releaseably connected to the instrument housing and extending from said proximal end to terminate at a distal end, said AE sensor housing supported on said distal end.

18. An AE sensor mounting assembly according to claim 16 wherein said AE sensor housing is releaseably connected to said mounting member.

19. An AE sensor mounting assembly according to claim 16 wherein a downstream one of said end caps is removably attached to said mounting member, and wherein an upstream one of said end caps receives said AE sensor.

20. An AE sensor mounting assembly according to claim 16 including at least one photo detector mounted on said circuit board and adapted to be placed in electrical communication with said processing circuitry, said photo detector being responsive to fluorescent light caused by said emission of ultraviolet light to generate a photo detection signal for processing.

21. An AE sensor mounting assembly according to claim 16 wherein said micro-phonic element and said ultraviolet LEDs are mounted on a first surface of said circuit board and project forwardly in an upstream direction, and wherein an upstream one of said end caps includes a central bore that is directionally aligned with said micro-phonic element, and a plurality of radially offset bores each axially aligned with a respective one of said ultraviolet LEDs, and including at least one visible LED mounted on said circuit board for emitting visible light upon emission of ultraviolet light from said ultraviolet LEDs, thereby to indicate an on state for the ultraviolet LEDs.

22. An AE sensor mounting assembly according to claim 21 including a plurality of visible LEDs mounted on an opposite second surface of said circuit board and adapted to be placed in electrical communication with said processing circuitry, said visible LEDs operative upon emission of visible light to illuminate an area in a vicinity of said AE sensor housing.

23. An AE sensor mounting assembly according to claim 22 wherein said LEDs are equiangularly distributed about said micro-phonic element.

24. An AE sensor mounting assembly according to claim 16 including a plurality of visible LEDs mounted on said circuit board and adapted to be placed in electrical communication with said processing circuitry, said visible LEDs operative upon emission of visible light to illuminate an area in a vicinity of said AE sensor housing.

25. An AE sensor mounting assembly according to claim 24 including a light transmissive annular ring sandwiched between said end caps in radial alignment with said visible LEDs.

26. In a leak detection instrument having an instrument housing, an acoustic emissions (AE) sensor supported relative to said instrument housing that is operative upon exposure to sound attendant with leakage from a device to produce a corresponding sound detection input signal, AE sensor processing circuitry disposed within said instrument housing for receiving the sound detection input signal and producing an AE sensor output signal in response thereto, and output circuitry for generating associated AE sensor perceptible output in response to said AE sensor output signal, the improvement comprising:

a. a gas sensor supported within the instrument housing, said gas sensor operative upon exposure to a selected gas to generate a corresponding gas detection input signal;

b. a pump supported within the instrument housing and operative upon actuation to draw air past said gas sensor; and c. gas sensor processing circuitry in electrical communication with said gas sensor, said gas sensor processing circuitry operative in response to said gas detection input signal to generate a corresponding gas detection output signal.

27. The improvement according to claim 26 wherein said output circuitry is operative in response to said gas detection output signal to generate associated gas sensor perceptible output in response thereto.

28. The improvement according to claim 26 wherein said gas sensor is selected from a group consisting of a chemical properties leak detector (CPLD), a thermal conductivity detector (TCD), a photo-ionization detector (PID), a laser interferometer (LID), a corona discharge detector (CDD), a microelectromechanical (MEMS) based detector, a Chemical Resistor Sensor (CRS), and a surface acoustic wave (SAW) sensor.

29. A method of monitoring a device to ascertain leakage of a target gas there-from, comprising:

a. providing a gas sensor that is operative upon exposure to the target gas to generate a corresponding gas detection input signal;

b. providing an AE sensor that is operative upon exposure to airborne sound emanating from the device that is attendant with leakage of the target gas to generate a corresponding sound detection input signal;

c. visibly illuminating an area in a vicinity of an upstream location that is in a vicinity of a suspected leak;

d. drawing the target gas along a gas flow passageway from the upstream location towards a downstream location, whereby the target gas encounters said gas sensor and said gas sensor generates said gas detection input signal;

e. exposing said AE sensor to the airborne sound whereby said AE sensor generates said sound detection input signal;

f. processing said gas detection input signal and said sound detection input signal to produce at least one output signal in response thereto; and g. displaying perceptible output in response to said output signal.

30. A method according to claim 29 whereby said sound detection input signal and said gas detection input signal are parallel processed.

31. A method according to claim 29 including illuminating an area in a vicinity of said upstream location with ultraviolet light, thereby to cause the target gas or its residue to fluoresce.

32. A method according to claim 29 including passing the target gas through a hydrophilic filter that is interposed between said gas sensor and said AE sensor.

33. A method according to claim 32 including monitoring said hydrophilic filter in order to produce a blocked filter indication (BFI) signal for processing if efficacy of said filter is reduced below a selected threshold.

34. A method according to claim 29 whereby said gas detection input signal and said sound detection input signal are processed by at least one processing component selected from a group consisting of a microprocessor, a microcontroller and a digital signal processor (DSP).

35. A method of monitoring a device to ascertain leakage of a target gas therefrom, comprising:

a. providing a gas sensor that is operative upon exposure to the target gas to generate a corresponding gas detection input signal;

b. providing an AE sensor that is operative upon exposure to airborne sound emanating from the device that is attendant with leakage of the target gas to generate a corresponding sound detection input signal;

c. passing the target gas through a hydrophilic filter that is interposed between said gas sensor and said AE sensor;

d. exposing said gas sensor to the target gas whereby said gas sensor generates said gas detection input signal;

e. exposing said AE sensor to the airborne sound whereby said AE sensor generates said sound detection input signal;

f. processing said gas detection input signal and said sound detection input signal to produce at least one output signal in response thereto; and g. displaying perceptible output in response to said output signal.

36. A method according to claim 35 including monitoring said hydrophilic filter in order to produce a blocked filter indication (BFI) signal for processing if efficacy of said filter is reduced below a selected threshold.

37. A method according to claim 35 whereby said gas detection input signal and said sound detection input signal are processed by at least one processing component selected from a group consisting of a microprocessor, a microcontroller and a digital signal processor (DSP).

* * * * *